United States Patent
Constant et al.

(10) Patent No.: US 10,889,938 B2
(45) Date of Patent: Jan. 12, 2021

(54) COATED SUBSTRATE COMPRISING A SURFACE-TREATED, AQUEOUS-BASED POLYMER COATING AND METHODS OF MAKING AND USING THE SAME

(71) Applicant: BASF SE, Ludwigshafen (DE)

(72) Inventors: David R. Constant, Fort Mill, SC (US); David R. Cordier, Matthews, NC (US); Sharad Mathur, Tega Cay, SC (US); Peter Hayes, Charlotte, NC (US)

(73) Assignee: BASF SE

( * ) Notice: Subject to any disclaimer, the term of this patent is extended or adjusted under 35 U.S.C. 154(b) by 152 days.

(21) Appl. No.: 15/573,198

(22) PCT Filed: May 12, 2016

(86) PCT No.: PCT/US2016/032087
§ 371 (c)(1),
(2) Date: Nov. 10, 2017

(87) PCT Pub. No.: WO2016/183314
PCT Pub. Date: Nov. 17, 2016

(65) Prior Publication Data
US 2018/0135251 A1    May 17, 2018

Related U.S. Application Data

(60) Provisional application No. 62/160,252, filed on May 12, 2015.

(51) Int. Cl.
*D21H 19/58*    (2006.01)
*B65D 65/42*    (2006.01)
(Continued)

(52) U.S. Cl.
CPC ............... *D21H 19/58* (2013.01); *B32B 1/02* (2013.01); *B32B 23/04* (2013.01); *B32B 25/08* (2013.01);
(Continued)

(58) Field of Classification Search
CPC ........ D21H 19/58; D21H 19/22; D21H 27/30; D21H 19/36; D21H 21/16; D21H 19/20;
(Continued)

(56) References Cited

U.S. PATENT DOCUMENTS

2005/0276944 A1*  12/2005  Muggli ..................... C08J 5/12
                                                                              428/36.91
2011/0046284 A1    2/2011  Berube et al.
2013/0130025 A1*   5/2013  Farwaha ............... C09D 131/04
                                                                                428/342

FOREIGN PATENT DOCUMENTS

EP    1498544 A1    1/2005
WO    2012/170623 A2    12/2012
WO    2015/020749 A1    2/2015

OTHER PUBLICATIONS

International Search Report and Written Opinion dated Aug. 22, 2016, from International Application No. PCT/US2016/032087, 11 pages.

* cited by examiner

*Primary Examiner* — James C Yager
(74) *Attorney, Agent, or Firm* — Faegre Drinker Biddle & Reath

(57) ABSTRACT

Disclosed herein are, for instance, coated substrates comprising cellulose-based substrates with surface-treated aqueous-based polymer coatings. In some embodiments, the aqueous-based polymer coatings are surface-treated using corona treatment. Methods of making and using the same are also disclosed.

6 Claims, 12 Drawing Sheets

(51) Int. Cl.
| | |
|---|---|
| D21H 25/06 | (2006.01) |
| D21H 27/14 | (2006.01) |
| D21H 19/82 | (2006.01) |
| B32B 27/06 | (2006.01) |
| D21H 19/20 | (2006.01) |
| D21H 21/16 | (2006.01) |
| D21H 19/36 | (2006.01) |
| B65D 3/06 | (2006.01) |
| D21H 27/30 | (2006.01) |
| B32B 27/30 | (2006.01) |
| D21H 19/22 | (2006.01) |
| B32B 1/02 | (2006.01) |
| B32B 29/00 | (2006.01) |
| B32B 27/10 | (2006.01) |
| B32B 27/16 | (2006.01) |
| B32B 25/08 | (2006.01) |
| B32B 23/04 | (2006.01) |
| C08J 7/04 | (2020.01) |
| C08J 7/12 | (2006.01) |
| D21H 19/40 | (2006.01) |

(52) U.S. Cl.
CPC .............. *B32B 27/06* (2013.01); *B32B 27/10* (2013.01); *B32B 27/16* (2013.01); *B32B 27/302* (2013.01); *B32B 27/308* (2013.01); *B32B 29/002* (2013.01); *B65D 3/06* (2013.01); *B65D 65/42* (2013.01); *C08J 7/0427* (2020.01); *C08J 7/123* (2013.01); *D21H 19/20* (2013.01); *D21H 19/22* (2013.01); *D21H 19/36* (2013.01); *D21H 19/40* (2013.01); *D21H 19/82* (2013.01); *D21H 19/826* (2013.01); *D21H 21/16* (2013.01); *D21H 25/06* (2013.01); *D21H 27/14* (2013.01); *D21H 27/30* (2013.01); *B32B 2274/00* (2013.01); *B32B 2307/4026* (2013.01); *B32B 2307/704* (2013.01); *B32B 2307/718* (2013.01); *B32B 2307/73* (2013.01); *B32B 2307/732* (2013.01); *B32B 2439/70* (2013.01); *C08J 2301/02* (2013.01); *C08J 2423/06* (2013.01); *C08J 2423/08* (2013.01); *C08J 2425/08* (2013.01); *C08J 2433/02* (2013.01); *C08J 2433/08* (2013.01); *Y02P 20/582* (2015.11)

(58) Field of Classification Search
CPC ...... D21H 19/82; D21H 27/14; D21H 19/826; D21H 19/40; D21H 25/06; B32B 23/04; B32B 25/08; B32B 27/16; B32B 27/302; B32B 27/10; B32B 29/002; B32B 1/02; B32B 27/06; B32B 27/308; B32B 2307/704; B32B 2307/732; B32B 2307/718; B32B 2307/73; B32B 2307/4026; B32B 2274/00; B32B 2439/70; B65D 3/06; B65D 65/42; Y02P 20/582; C08J 7/123; C08J 7/047; C08J 2433/08; C08J 2433/02; C08J 2425/08; C08J 2423/08; C08J 2423/06; C08J 2301/02; C09D 167/00; C09D 133/00; C09D 123/06; C09D 109/06
See application file for complete search history.

COATED SUBSTRATE COMPRISING A SURFACE-TREATED, AQUEOUS-BASED POLYMER COATING AND METHODS OF MAKING AND USING THE SAME

CROSS REFERENCE TO RELATED APPLICATIONS

This application is a national stage application filed under 35 U.S.C. § 371 of PCT/US2016/032087 filed May 12, 2016, which claims the benefit of U.S. Provisional Application No. 62/160,252 filed May 12, 2015, which is hereby incorporated in its entirety.

FIELD OF THE DISCLOSURE

The present disclosure relates to improved aqueous-based polymer coatings for cellulose-based substrates, and methods of making and using the same.

BACKGROUND

Polyethylene films on cellulose-substrates provide good barrier properties (i.e., resistance to water, grease, oil, and moisture vapor). Because a polyethylene film is thermoplastic at low temperatures, it can be heat-sealed to itself, providing a bond without an additional adhesive being used. Due to sustainability concerns, there has been an industry focus on reducing the use of polyethylene for coatings on cellulose substrates, for instance, by using aqueous-based polymer coatings instead. However, aqueous-based polymer coatings with improved properties on cellulose-based substrates are desired. For example, liquid pressure can become significant at the bottom of a cup when full, with the result that leaks sometimes develop where the cup bottom is bonded to the sidewall. Leaks may also develop where difficult shapes have been bonded. Thus, there is a need for aqueous-based polymer coatings with improved adhesion. There is also a need for cellulose-substrates with improved adhesion between overlapping edges. The compositions and methods disclosed herein address these and other needs.

SUMMARY OF THE DISCLOSURE

Disclosed herein are, for instance, coated substrates comprising cellulose-based substrates with surface-treated aqueous-based polymer coatings. The coated substrates can comprise a cellulose-based substrate and an aqueous-based polymer coating on a surface of the cellulose-based substrates, wherein the aqueous-based polymer coating has been surface-treated. In some embodiments, the surface treatment can be a high energy discharge. In some examples, the aqueous-based polymer coating can be surface treated using corona-treatment. In some embodiments, the cellulose-based substrate is paperboard. In some embodiments, the aqueous-based polymer coating comprises a pure acrylic copolymer, a styrene-acrylic copolymer, a styrene-butadiene copolymer, a vinyl acrylic copolymer, or a combination thereof. In some embodiments, the aqueous-based polymer coating comprises an oligomer-stabilized styrene acrylic copolymer latex, a surfactant-stabilized styrene acrylic copolymer latex, or combinations thereof. The aqueous-based polymer coating can have a coating weight of 2 g/m$^2$ to 30 g/m$^2$ (e.g., 10 g/m$^2$ to 25 g/m$^2$). In some embodiments, the aqueous-based polymer coating further comprises a pigment that has been treated with a material selected from the group consisting of surfactants; hydrophobically-modified polymers; styrene-acrylic resin emulsions; styrene-butadiene latex emulsions; silanes, siloxanes, siloxane/silicone resin blends, and their carbon-based analogs; and combinations thereof to form a treated pigment.

Also disclosed herein are, for instance; paper cups comprising a side portion and a bottom portion, and a first aqueous-based polymer coating on a first surface of the paper cup, the first surface comprising one or more of an interior surface of the side portion or an interior surface of the bottom portion, wherein the first aqueous-based polymer coating has been surface-treated, and wherein a bottom edge of the side portion is bonded to a side edge of the bottom portion via a seal comprising the first aqueous-based polymer coating. The first surface can comprise the interior surface of the bottom portion of the paper cup, the interior surface of the side portion of the paper cup, or both. In some embodiments, the paper cup comprises a second coating comprising a semi crystalline polymer on a second surface of the paper cup. The second surface can comprise an interior surface of the bottom portion of the cup when the first surface is the interior surface of the side portion. The second surface can comprise an interior surface of the side portion of the cup when the first surface is the interior surface of the bottom portion. The bottom edge of the side portion of the paper cup can be bonded to a side edge of the bottom portion via a seal comprising the first aqueous-based polymer coating and the second coating. The side portion of the paper cup can be adhered to itself along a side edge. In some embodiments, the first aqueous-based polymer coating has been surface treated with a high energy discharge. In some examples, the first aqueous-based polymer coating has been corona-treated.

In some embodiments, the semicrystalline polymer comprises low density polyethylene, aliphatic aromatic polyester, nylon, or a combination thereof. In some examples, the semicrystalline polymer can be a low density polyethylene homopolymer or a low density polyethylene copolymer. The semicrystalline polymer can optionally have polar functionality. In some embodiments, the low density polyethylene copolymer can be a copolymer of ethylene and a monomer comprising methyl acrylate, methacrylic acid, or a combination thereof. The second coating can have a thickness of 0.4 mils to 2 mils. The second coating can have a melting point temperature of 95° C. to 105° C. The second coating can have a density of 0.65 g/cm$^3$ to 1.1 g/cm$^3$.

The paper cup, in some embodiments, does not exhibit a leak along the seal of the paper cup for thirty minutes after substantially filling the cup with hot coffee at an initial temperature of 90° C.

Also disclosed herein are methods of making the coated substrates and paper cups disclosed herein. Those methods can include corona treating an aqueous-based polymer coating. In some embodiments, the corona treatment is conducted at 1 to 4 (e.g., 2 to 4) watts per square foot per minute.

The details of one or more embodiments are set forth in the description below. Other features, objects, and advantages will be apparent from the description and from the claims.

DETAILED DESCRIPTION

Figure 1:
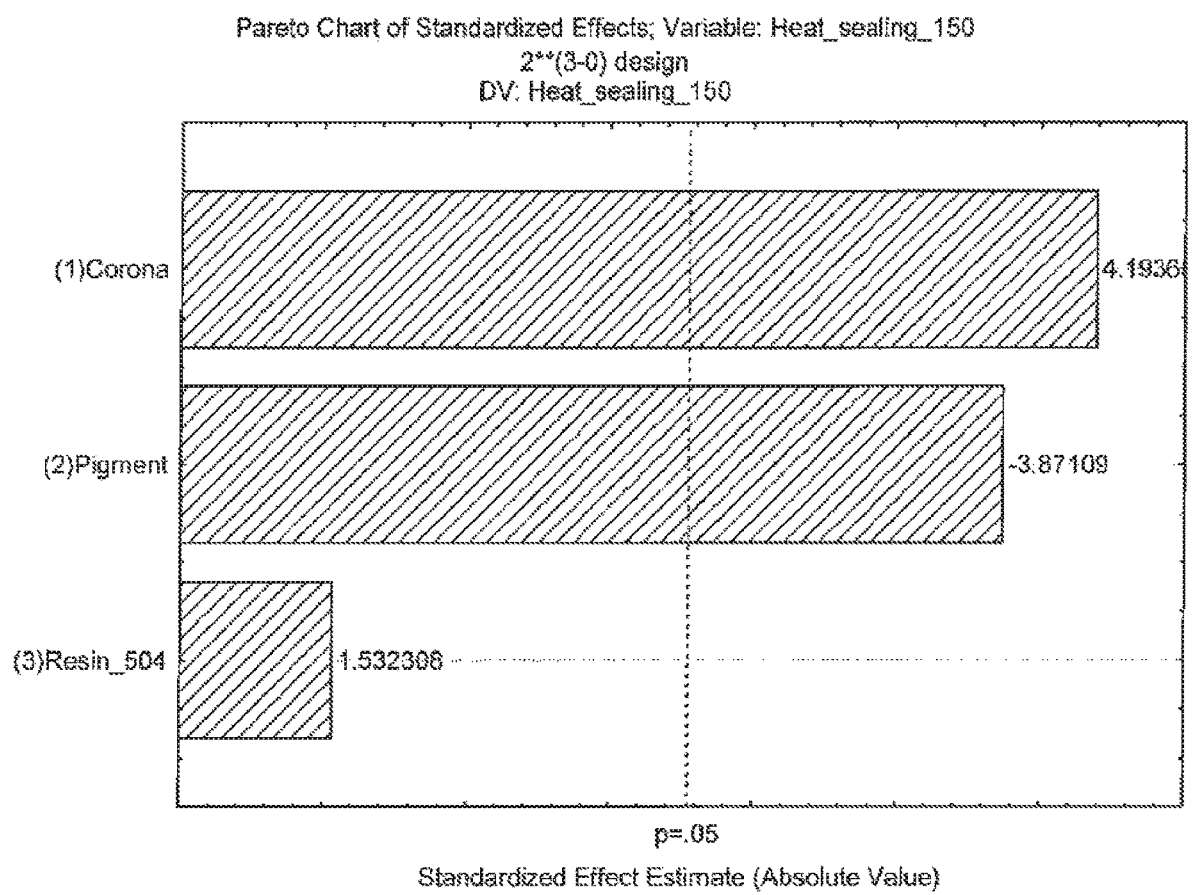
FIG. 1 is a Pareto chart showing the effects of corona treatment, pigment (clay), and resin on heat sealing at 150° C., at a standardized effect estimate of p=0.5 (95% confidence level).

The present disclosure relates to, among other things, coated substrates comprising cellulose-based substrates with surface treated aqueous-based polymer coatings. The coated substrates comprise cellulose-based substrates and aqueous-based polymer coatings on a surface of the cellulose-based substrates, wherein the aqueous-based polymer coating has been surface treated. In some embodiments, the aqueous-based polymer coating can be surface treated using a high energy discharge. For example, the first aqueous-based polymer coating can be surface treated using corona-treatment. The present disclosure also relates to paper cups comprising the coated substrates. Methods of making the paper cups and coated substrates are also disclosed herein. This disclosure also relates, in some embodiments, to paper cups comprising cellulose-based substrates coated with the aqueous-based polymer coating described above. The paper cups can also comprise, in some embodiments, cellulose-based substrates coated with semicrystalline polymer coatings.

The cellulose-based substrate can comprise any paper capable of being coated with a semicrystalline polymer and/or an aqueous-based polymer coating. The cellulose-based substrate can comprise cellulose fibers and/or additional fibers such as polymeric fibers. In some embodiments, the cellulose-based substrate comprises paper, paper board, or cardboard. The cellulose-based substrate can comprise recycled paper. The cellulose-based substrate can be suitable for use as a release liner, paper tray, or paper cup, for instance.

In some embodiments, the cellulose-based substrate has a basis weight of 80 $g/m^2$ or greater (e.g., 90 $g/m^2$ or greater, 100 $g/m^2$ or greater, 110 $g/m^2$ or greater, 120 $g/m^2$ or greater, 130 $g/m^2$ or greater, 140 $g/m^2$ or greater, 150 $g/m^2$ or greater, 160 $g/m^2$ or greater, 170 $g/m^2$ or greater, 180 $g/m^2$ or greater, 190 $g/m^2$ or greater, 200 $g/m^2$ or greater, 210 $g/m^2$ or greater, 220 $g/m^2$ or greater, 230 $g/m^2$ or greater, 240 $g/m^2$ or greater, 250 $m^2$ or greater, 260 $g/m^2$ or greater, 270 $g/m^2$ or greater, 280 $g/m^2$ or greater, 290 $g/m^2$ or greater, 300 $g/m^2$ or greater, 310 $g/m^2$ or greater, 320 $g/m^2$ or greater, 330 $g/m^2$ or greater, 340 $g/m^2$ or greater, 350 $g/m^2$ or greater, 360 $g/m^2$ or greater, 370 $g/m^2$ or greater, 380 $g/m^2$ or greater, 390 $g/m^2$ or greater, 400 $g/m^2$ or greater, 450 $g/m^2$ or greater or 500 $g/m^2$ or greater). In some embodiments, the cellulose-based substrate may have a basis weight of 600 $g/m^2$ or less (e.g., 550 $g/m^2$ or less, 500 $g/m^2$ or less, 450 $g/m^2$ or less, 420 $g/m^2$ or less, 390 $g/m^2$ or less, 380 $g/m^2$ or less, 370 $g/m^2$ or less, 360 $g/m^2$ or less, 350 $g/m^2$ or less, 340 $g/m^2$ or less, 330 $g/m^2$ or less, 320 $g/m^2$ or less, 310 $g/m^2$ or less, 300 $g/m^2$ or less, 290 $g/m^2$ or less, 280 $g/m^2$ or less, 270 $g/m^2$ or less, 260 $g/m^2$ or less, 250 $g/m^2$ or less, 240 $g/m^2$ or less, 230 $g/m^2$ or less, 220 $g/m^2$ or less, 210 $g/m^2$ or less, 200 $g/m^2$ or less, 190 $g/m^2$ or less, 180 $g/m^2$ or less, 170 $g/m^2$ or less, 160 $g/m^2$ or less, 150 $g/m^2$ or less, 140 $g/m^2$ or less, 130 $g/m^2$ or less, 120 $g/m^2$ or less, 110 $g/m^2$ or less, 100 $g/m^2$ or less, 90 $g/m^2$ or less, 80 $g/m^2$ or less, or 70 $g/m^2$ or less). In some embodiments, the cellulose-based substrate has a basis weight from 80 $g/m^2$ to 600 $g/m^2$ (e.g., from 90 $g/m^2$ to 550 $g/m^2$, from 100 $g/m^2$ to 500 $g/m^2$, from 110 $g/m^2$ to 450 $g/m^2$, or from 120 $g/m^2$ to 400 $g/m^2$. In some embodiments, the cellulose-based substrate has a basis weight that is suitable for use in a paper cup (e.g., 285 $g/m^2$ to 400 $g/m^2$).

An aqueous-based polymer coating can be on a surface of the cellulose-based substrate, wherein the aqueous-based polymer coating has been surface treated. The aqueous-based polymer coating can comprise an aqueous-based polymer that can be water-soluble and/or water-dispersible. In some embodiments, the aqueous-based polymer coating can comprise a pure acrylic copolymer, a styrene-acrylic copolymer, a styrene-butadiene copolymer, a vinyl acrylic copolymer, or a combination thereof. The aqueous-based polymer coating comprises, in some embodiments, a polyvinyl acetate polymer or ethylene vinyl acrylic copolymer.

In some embodiments, the aqueous-based polymer coating is a coating as described in U.S. Patent Application Publication No. 2011/0046284, which is incorporated herein by reference in its entirety. For instance, the aqueous-based polymer coating can include a pigment having at least one of the following desired attributes:

acceptable morphology appropriate to a given application;
controlled surface area, engineered morphology particles;
ultrafine size particles;
highly porous particles having pore size distribution and surface area tailored to the target barrier coating application; and
high surface area particles.

The pigment can also undergo a thermal treatment process and then, with or without the thermal treatment, can be treated with a material that will facilitate repulsion of water and/or significantly slow the rate of diffusion of the target species (high surface tension or contact angle). The pigments can be treated with materials that may include, but are not limited to:

surfactants such as stearates;
hydrophobically modified polymers such as polyethyleneimine (PEI);
styrene-acrylic resin emulsion chemistries;
styrene-butadiene latex chemistries;
silanes, siloxanes, siloxane/silicon resin blends, and their carbon-based analogs; and
combinations thereof.

In some embodiments, the pigment can be treated with a copolymer such as a styrene acrylic copolymer derived from monomers including styrene, (meth)acrylic acid, (meth)acrylic acid esters, (meth)acrylamide, (meth)acrylonitrile, and mixtures thereof. For example, the styrene acrylic copolymer can include styrene and at least one of (meth)acrylic acid, itaconic acid, methyl (meth)acrylate, ethyl (meth)acrylate, n-butyl (meth)acrylate, isobutyl (meth)acrylate, tert-butyl (meth)acrylate, 2-ethylhexyl (meth)acrylate, (meth)acrylamide, (meth)acrylonitrile, and hydroxyethyl (meth)acrylate.

In some embodiments, the pigment can be treated with a styrene-butadiene copolymer derived from monomers including styrene, butadiene, (meth)acrylamide, (meth)acrylonitrile, itaconic acid and (meth)acrylic acid. The styrene butadiene copolymer can also include from 0 to 3 phm (parts per hundred monomer) of one or more crosslinking monomers such as divinylbenzene.

The pigment system can be a stable slurry that can contain any of the combination of pigments described above as well as a dispersant, an optional defoamer and a thickener. The dispersant can be a latex, starch or polyvinyl alcohol (PVOH). Natural thickening aids such as starch or protein or synthetic polymers such as STEROCOLL FS (available from BASF Corporation) can be used to thicken/stabilize the pigment system. The barrier coating formulation consists of the pigment system, an optional defoamer/de-aeration/antifoam agent, a cross linker (glyoxal or AZC for example), and a binder. The binder is can be a styrene acrylic resin emulsion (SA), a styrene butadiene latex (SB latex), PVOH, starch, protein and a combination thereof, which can also contribute to the barrier properties.

The aqueous-based polymer coating can have, in some embodiments, a coating weight of 2 $g/m^2$ or greater (e.g., 3 $g/m^2$ or greater, 4 $g/m^2$ or greater, 5 $g/m^2$ or greater, 6 $g/m^2$ or greater, 7 $g/m^2$ or greater, 8 $g/m^2$ or greater, 9 $g/m^2$ or greater, 10 $g/m^2$ or greater, 11 $g/m^2$ or greater, 12 $g/m^2$ or greater, 13 $g/m^2$ or greater, 14 $g/m^2$ or greater, 15 $g/m^2$ or greater, 16 $g/m^2$ or greater, 17 $g/m^2$ or greater, 18 $g/m^2$ or greater, 19 $g/m^2$ or greater, 20 $g/m^2$ or greater, 21 $g/m^2$ or greater, 22 $g/m^2$ or greater, 23 $g/m^2$ or greater, 24 $g/m^2$ or greater, 25 $g/m^2$ or greater, 26 $g/m^2$ or greater, 27 $g/m^2$ or greater, 28 $g/m^2$ or greater, or 29 $g/m^2$ or greater). The aqueous-based polymer coating can have, in some embodiments, a coating weight of 30 $g/m^2$ or less (e.g., 29 $g/m^2$ or less, 28 $g/m^2$ or less, 27 $g/m^2$ or less, 26 $g/m^2$ or less, 25 $g/m^2$ or less, 24 $g/m^2$ or less, 23 $g/m^2$ or less, 22 $g/m^2$ or less, 21 $g/m^2$ or less, 20 $g/m^2$ or less, 19 $g/m^2$ or less, 18 $g/m^2$ or less, 17 $g/m^2$ or less, 16 $g/m^2$ or less, 15 $g/m^2$ or less, 14 $g/m^2$ or less, 13 $g/m^2$ or less, 12 $g/m^2$ or less, 11 $g/m^2$ or less, 10 $g/m^2$ or less, 9 $g/m^2$ or less, 8 $g/m^2$ or less, 7 $g/m^2$ or less, 6 $g/m^2$ or less, 5 $g/m^2$ or less, 4 $m^2$ or less, or 3 $g/m^2$ or less). The aqueous-based polymer coating can have, in some embodiments, a coating weight of from 2 $g/m^2$ to 30 $g/m^2$ (e.g., 5 $g/m^2$ to 28 $g/m^2$, or from 10 $g/m^2$ to 25 $g/m^2$). The coating weight can be reported in units of grams of coating per square meter of cellulose-based substrate, and can be calculated directly by the amount of coating applied and the surface area of the cellulose-based substrate that the coating is applied to. The aqueous-based polymer coating, in some embodiments, can be applied in an amount of less than 15% by weight based on the weight of the coated cellulose-based substrate.

In some embodiments, the cellulose-based substrates and/or paper cups disclosed herein further comprise a second coating comprising a semicrystalline polymer. The second coating comprising a semicrystalline polymer is also called herein a semicrystalline polymer coating. The semicrystalline polymer can comprise, in some embodiments, low density polyethylene (LDPE), "functionalized" low density polyethylene copolymers, aliphatic aromatic polyester, aliphatic aromatic polyester/polylactic acid (PLA) compounded polymer, aliphatic polyamide (nylon), silicone (including platinum-catalyzed silicone), or a combination thereof. Suitable examples of semicrystalline polymers can include copolymers of ethylene and a monomer comprising methyl acrylate, methacrylic acid, or a combination thereof. In some embodiments, the acrylic monomer in the ethylene copolymer can be in an amount of 40% or less. For example, the acrylic monomer in the ethylene copolymer can be in an amount from 4% to 25%, 4% to 20%, 6% to 15%, 6% to 13%. In some embodiments, the semicrystalline polymer comprises a compostable, biodegradable polymer.

The second coating can comprise, in some embodiments, a low density polyethylene homopolymer or a low density polyethylene copolymer. In some embodiments, the polyethylene copolymer can optionally comprise polar functionality (i.e., can be modified to include a functional monomer so that the polarity of the low density polyethylene copolymer is greater than the polarity of low density polyethylene homopolymer). The second coating can comprise a low density polyethylene copolymer prepared by polymerizing an ethylene monomer and an acrylic monomer. The acrylic monomer can be selected from methacrylic acid, methyl acrylate, or a combination thereof. Methods of preparing these copolymers are known in the art and they can be prepared, for example, using coordination or radical polymerization. In some embodiments, the acrylic monomer is present in an amount of 3% or greater (e.g., 4% or greater, 5% or greater, 6% or greater, 7% or greater, 8% or greater, 9% or greater, 10% or greater, 11% or greater, 12% or greater, 13% or greater, 14% or greater, 15% or greater, 16% or greater, 17% or greater, 18% or greater, or 19% or greater) by weight of the low density polyethylene copolymer. In some embodiments, the acrylic monomer is present in an amount of 20% or less (e.g., 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, or 4% or less) by weight of the low density polyethylene copolymer. In some embodiments, the acrylic monomer is present in an amount of from 3% to 20% (e.g., 4% to 15% or 5% to 10%) by weight of the low density polyethylene copolymer.

In some embodiments, the semicrystalline polymer has a density of 0.65 $g/cm^3$ or greater (e.g., 0.7 $g/cm^3$ or greater, 0.75 $g/cm^3$ or greater, 0.8 $g/cm^3$ or greater, 0.85 $g/cm^3$ or greater, 0.9 $g/cm^3$ or greater, 0.95 $g/cm^3$ or greater, 1 $g/cm^3$ or greater, 1.05 $g/cm^3$ or greater, 1.1 $g/cm^3$ or greater, 1.15 $g/cm^3$ or greater, 1.2 $g/cm^3$ or greater, 1.25 $g/cm^3$ or greater, 1.3 $g/cm^3$ or greater, 1.35 $g/cm^3$ or greater, 1.4 $g/cm^3$ or greater, or 145 $g/cm^3$ or greater) as measured by ASTM D792 (2008). In some embodiments, the semicrystalline polymer has a density of 1.5 $g/cm^3$ or less (e.g., 1.45 $g/cm^3$ or less, 1.4 $g/cm^3$ or less, 1.35 $g/cm^3$ or less, 1.3 $g/cm^3$ or less, 1.25 $g/cm^3$ or less, 1.2 $g/cm^3$ or less, 1.15 $g/cm^3$ or less, 1.1 $g/cm^3$ or less, 1 $g/cm^3$ or less, 0.95 $g/cm^3$ or less, 0.9 g/cm³ or less, 0.85 g/cm³ or less, 0.8 g/cm³ or less, 0.75 g/cm³ or less, or 0.7 g/cm³ or less), as measured by ASTM D792 (2008). In some embodiments, the semicrystalline polymer has a density of from 0.65 g/cm³ to 1.5 g/cm³ (e.g., from 0.7 g/cm³ to 1.4 g/cm³ or from 0.75 g/cm³ to 1.25 g/cm³), as measured by ASTM D792. (2008).

The semicrystalline polymer has, in some embodiments, a melt flow rate of 2 g/10 min or greater (e.g., 3 g/10 min or greater, 4 g/10 min or greater, 5 g/10 min or greater, 6 g/10 min or greater, 7 g/10 min or greater, 8 g/10 min or greater, 9 g/10 min or greater, 10 g/10 min or greater, 11 g/10 min or greater, 12 g/10 min or greater, or 13 g/10 min or greater) as measured by ASTM D1238 (2010). The semicrystalline polymer has, in some embodiments, a melt flow rate of 14 g/10 min or less (e.g., 13 g/10 min or less, 12 g/10 min or less, 11 g/10 min or less, 10 g/10 min or less, 9 g/10 min or less, 8 g/10 min or less, 7 g/10 min or less, 6 g/10 min or less, 5 g/10 min or less, 4 g/10 min or greater, or 3 g/10 min or greater) as measured by ASTM D1238 (2010).

In some embodiments, the semicrystalline polymer has a melting point temperature (DSC) of 70° C. or greater (e.g., 80° C. or greater, 90° C. or greater, 110° C. or greater, 120° C. or greater, 130° C. or greater, 140° C. or greater, 150° C. or greater, 160° C. or greater, 170° C. or greater, 180° C. or greater, 190° C. or greater, or 200° C. or greater), as measured by ASTM D3418 (2012-e1). In some embodiments, the semicrystalline polymer has a melting point temperature (DSC) of 210° C. or less (e.g., 200° C. or less, 190° C. or less, 180° C. or less, 170° C. or less, 160° C. or less, 150° C. or less, 140° C. or less, 130° C. or less, 120° C. or less, 110° C. or less, 100° C. or less, 90° C. or less, or 80° C. or less), as measured by ASTM D3418 (2012-e1). In some embodiments, the semicrystalline polymer has a melting point temperature (DSC) of from 70° C. to 210° C. (e.g., from 80° C. to 200° C., from 90° C. to 180° C., or from 100° C. to 150° C.), as measured by ASTM D3418 (2012-e1). In some embodiments, the semicrystalline polymer has more than one (e.g., 2) melting point temperature peaks, as measured by ASTM D3418 (2012-e1).

In some embodiments, the semicrystalline polymer has a Vicat softening point of 40° C. or greater (e.g., 45° C. or greater, 50° C. or greater, 55° C. or greater, 60° C. or greater, 65° C. or greater, 70° C. or greater, 75° C. or greater, 80° C. or greater, 85° C. or greater, or 90° C. or greater) as measured by ASTM D1525 (2009). In some embodiments, the semicrystalline polymer has a Vicat softening point of from 40° C. to 95° C. (e.g., 50° C. to 90° C., or from 60° C. to 85° C.) as measured by ASTM D1525 (2009).

The semicrystalline polymer coating can have, in some embodiments, a thickness of from 0.4 mils or greater (e.g., 0.5 mils or greater, 0.6 mils or greater, 0.7 mils or greater, 0.8 mils or greater, 0.9 mils or greater, 1 mils or greater, 1.1 mils or greater, 1.2 mils or greater, 1.3 mils or greater, 1.4 mils or greater, 1.5 mils or greater, 1.6 mils or greater, 1.7 mils or greater, 1.8 mils or greater, or 1.9 or greater). The semicrystalline polymer coating can have, in some embodiments, a thickness of 2 mils or less (e.g., 1.9 mils or less, 1.8 mils or less, 1.7 mils or less, 1.6 mils or less, 1.5 mils or less, 1.4 mils or less, 1.3 mils or less, 1.2 mils or less, 1 mils or less, 0.9 mils or less, 0.8 mils or less, 0.7 mils or less, 0.6 mils or less, or 0.5 mils or less). The semicrystalline polymer coating can have, in some embodiments, a thickness of from 0.4 mils to 2 mils (e.g., from 0.5 mils to 1.8 mils, from 0.6 mils to 1.6 mils, or from 0.75 mils to 1.5 mils). The coating thickness can be calculated based on the density of the coating and the weight of the coated cellulose-based substrate.

In some embodiments, the semicrystalline polymer coating, in some embodiments, can be applied in an amount of less than 15% by weight based on the weight of the coated cellulose-based substrate.

The aqueous-based polymer coating and/or semicrystalline polymer coating can, in some embodiments, further include one or more additives. The one or more additives, in some embodiments, can include mineral fillers and/or coating pigments. Mineral fillers generally have a substantial proportion of particles having a particle size greater than 2 microns whereas coating pigments have a substantial proportion of particles having a particle size less than 2 microns. In some embodiments, the mineral fillers and/or coating pigments can be added to impart certain properties to a paper such as smoothness, whiteness, increased density or weight, decreased porosity, increased opacity, flatness, glossiness, and the like. The mineral fillers and/or coating pigments can include calcium carbonate (precipitated or ground), kaolin, clay, talc, diatomaceous earth, mica, barium sulfate, magnesium carbonate, vermiculite, graphite, carbon black, alumina, silicas (fumed or precipitated in powders or dispersions), colloidal silica, silica gel, titanium oxides, aluminum hydroxide, aluminum trihydrate, satine white, and magnesium oxide. The aqueous-based polymer coating and/or semicrystalline polymer coating, in some embodiments, can include exclusively mineral fillers or coating pigments or can include a blend of mineral fillers and coating pigments (e.g., weight ratios of 90:10, 80:20, 70:30, 60:40, 50:50, 40:60, 30:70, 20:80 or 10:90).

The aqueous-based polymer coating and/or semicrystalline polymer coating, in some embodiments, can include non-toxic anticorrosive pigments. Examples of such anticorrosive pigments include, but are not limited to, phosphate-type anticorrosive pigments such as zinc phosphate, calcium phosphate, aluminum phosphate, titanium phosphate, silicon phosphate, and ortho- and fused-phosphates thereof.

The aqueous-based polymer coating and/or semicrystalline polymer coating, in some embodiments, can include one or more dyes and/or colored pigments to produce a colored or patterned paper or to change the shade of the paper. Exemplary dyes can include basic dyes, acid dyes, anionic direct dyes, and cationic direct dyes. Exemplary colored pigments include organic pigments and inorganic pigments in the form of anionic pigment dispersions and cationic pigment dispersions.

The aqueous-based polymer coating and/or semicrystalline polymer coating, in some embodiments, can include additives such as thickeners, dispersants, initiators, stabilizers, chain transfer agents, buffering agents, salts, preservatives, fire retardants, wetting agents, protective colloids, biocides, corrosion inhibitors, crosslinkers, crosslinking promoters, and lubricants. The aqueous-based polymer coating and/or semicrystalline polymer coating can have, in some embodiments, an additive to prevent depolymerization (e.g., additives to prevent photoinitiation).

The cellulose-based substrates disclosed herein can comprise one or more types of coatings (e.g., two types of coatings). In some embodiments, the cellulose-based substrates disclosed herein (for instance, on the paper cups disclosed herein) can have more than one coating layer on the substrate, wherein the coating layers can comprise the same coating or different coatings, in some embodiments, the cellulose-based substrate comprises a layer of an aqueous-based polymer coating. In some embodiments, the cellulose-based substrate comprises a layer of an aqueous-based polymer coating applied onto a layer of the semicrystalline polymer coating. In some embodiments, the cellulose-based substrate comprises a layer of the semicrystalline polymer coating applied onto the aqueous-based polymer coating. In some embodiments, the cellulose-based substrate comprises an aqueous-based polymer coating and/or a semicrystalline polymer coating and an additional coating.

The present disclosure also relates to paper cups having cellulose-based substrates coated with the aqueous-based polymer coating, the semicrystalline polymer coating, or a combination thereof. The paper cup can have an interior surface, an exterior surface, a bottom portion, and a side portion. The aqueous-based polymer coating can be on a first surface and/or a second surface of the paper cup. The semicrystalline polymer coating can be on a second surface of the paper cup. The first surface, in some embodiments, comprises one or more of an interior surface of the side portion or an interior surface of the bottom portion. The second surface, in some embodiments, comprises one or more of an interior surface of the side portion or an interior surface of the bottom portion. The second surface can comprise an interior surface of the bottom portion of the paper cup with the first surface being the interior surface of the side portion. The first surface can comprise an interior surface of the bottom portion of the paper cup with the second surface being the interior surface of the side portion. In some embodiments, the entire interior surface of the bottom portion is coated. In some embodiments, only a portion (e.g., 10% or greater, 20% or greater, 30% or greater, 40% or greater, 50% or greater, 60% or greater, 70% or greater, 80% or greater, or 90% or greater) of the interior surface of the bottom portion is coated. In some embodiments, the entire interior surface of the side portion is coated. In some embodiments, only a portion (e.g., 10% or greater, 20% or greater, 30% or greater, 40% or greater, 50% or greater, 60% or greater, 70% or greater, 80% or greater, or 90% or greater) of the interior surface of the side portion is coated.

The aqueous-based coating can be coated onto a cellulose-based substrate using a paper machine in a mill or by a printing method. The semicrystalline polymer coating can be coated onto a cellulose-based substrate using a melt extrusion process. In some embodiments, the semicrystalline polymer coating can be coated onto the cellulose-based substrate at a melt extrusion temperature of 185° C. or greater (e.g., 190° C. or greater, 200° C. or greater, 210° C. or greater, 220° C. or greater, 230° C. or greater, 240° C. or greater, 250° C. or greater, 260° C. or greater, 270° C. or greater, 280° C. or greater, 290° C. or greater, 300° C. or greater, or 310° C. or greater). The melt extrusion temperature can be 320° C. or less (e.g., 315° C. or less, 310° C. or less, 300° C. or less, 290° C. or less, 280° C. or less, 270° C. or less, 260° C. or less, 250° C. or less, 240° C. or less, 230° C. or less, 220° C. or less, 210° C. or less, 200° C. or less, or 190° C. or less). The melt extrusion temperature of the semicrystalline polymer coating can be between 185° C. and 325° C. (e.g., from 215° C. to 320° C. or 235° C. to 315° C.).

The aqueous-based polymer coating on the cellulose substrate can be surface treated using any suitable process to modify the surface of the substrate for improved adhesion. In some embodiments, the aqueous-based polymer coating can be oxidized, smoothed (such as burning of fibers on the surface of the substrate), or combinations thereof, to improve adhesion. In some embodiments, the surface treatment can include a high energy discharge, for example an ionizing discharge and/or a thermal discharge. A "high energy discharge" as used herein refers to an energy source capable of altering the molecular bonds and/or energy on the surface of a material. In some embodiments, the energy source can break the molecular bonds on the surface of a material. The broken bonds are now free to attach to free radicals and other particles that exist in the high energy discharge environment. In some examples, the aqueous-based polymer coating can be surface treated (e.g., can have a physical surface treatment or a thermal treatment) using a process selected from corona treatment, plasma discharge treatment, flame treatment, or combinations thereof. Surface treating the aqueous-based polymer coatings can improve the heat seal and/or surface adhesion, for instance, between cellulose-based substrate layers cupstock layers).

In some embodiments, the aqueous-based polymer coatings are corona treated at a suitable power. The aqueous-based polymer coatings can be corona treated at a power level of 1 watt or greater. In some embodiments, the aqueous-based polymer coatings are corona treated at a power level of 1 to 4 watts per square foot per minute (e.g., 2 watts or greater, 2.5 watts or greater, 3 watts or greater, or 3.5 watts or greater). In some embodiments, the aqueous-based polymer coatings are corona treated at 4 watts or less (e.g., 3.5 watts or less, 3 watts or less, 2.5 watts or less, or 2 watts or less). In some embodiments, the aqueous-based polymer coatings are corona treated at 2-4 watts per square foot per minute. The exposure time of the aqueous-based polymer coating on the cellulose substrate to the corona treatment can be very low. For example, the exposure time can be less than 1 second. In some embodiments, the corona treatment can be conducted on a moving paper or paperboard substrate web run on a coating line. In some embodiments, the aqueous-based polymer coatings can be corona treated on a coating line using a line speed of 100 ft/min or greater. For example, the aqueous-based polymer coatings can be corona treated using a line speed of 500 ft/min to 5000 ft/min, such as 500 ft/min to 1000 ft/min. In some embodiments, the watt density, that is the amount of energy being applied to a substrate, can be determined using the equation below:

$$\frac{\text{Output power (in watts)}}{\text{Line speed (ft/min)} \times \text{width of the substrate (ft)} \times \text{number of sides}} = \text{watts/ft}^2/\text{minute}$$

In general a higher watt density can produce a higher dyne level (measurement of surface energy). In some embodiments, an increase in surface energy can increase the wettability and adhesion characteristics of the surface. Once the watt density is known to get the aqueous-based polymer coating to a certain dyne level, it can be used to predict the results, if any, of parameters changes such as line speed.

The semicrystalline polymer coatings disclosed herein are, in some embodiments, surface treated. Any surface treatment that increases the surface activity of the low density polyethylene homopolymer or low density polyethylene copolymer, for example, by oxidizing the polymer, can be used. Exemplary surface treatments can include those described herein, for example corona discharge, plasma discharge, and flame treatment. In some embodiments, the semicrystalline polymer coatings are surface-treated via corona treatment at 2-4 watts per square foot per minute (e.g., 2, 2.5, 3, 3.5, or 4). In some embodiments, the semicrystalline polymer coatings are surface-treated via corona treatment at 2-3 watts per square foot per minute. In some embodiments, the semicrystalline polymer coatings are corona treated for less than a second. In some embodiments, the semicrystalline polymer coatings can be corona treated on a coating line using a line speed of 100 ft/min or greater. For example, the semicrystalline polymer coatings can be corona treated using a line speed of 500 ft/min to 5000 ft/min; such as 500 ft/min to 1000 ft/min.

In some embodiments, surface thermal treatment, for example corona treatment of the aqueous-based polymer coating and/or semicrystalline polymer coating has no adverse effect on the leak resistance, stain-resistance, and/or block resistance of the paper compared to coatings that are not surface treated. For example, in some embodiments, the aqueous-based polymer coating and/or semi crystalline polymer coating can have similar levels of leak resistance, stain-resistance, and/or block resistance before and after corona treatment.

The coating(s) can be added to a cellulose-based substrate to form a coated substrate, wherein the coated substrate is then formed into a paper cup. The paper cup can be formed in any manner known in the art for forming paper cups. In some embodiments, the paper cup can be prepared by (a) applying a first coating comprising a first aqueous-based polymer coating onto at least a portion of a surface of a first paper substrate; (b) applying a second aqueous-based polymer coating onto at least a portion of a surface of a second substrate; (c) forming a side wall from one of the first paper substrate and the second paper substrate and bonding the side wall to itself along a side edge; (d) forming a bottom from one of the first paper substrate and the second paper substrate; and (e) bonding the side wall along a bottom edge to the bottom along a side edge to form the paper cup. In some embodiments, the paper cup is prepared by (a) applying a first coating comprising a first aqueous-based polymer coating onto at least a portion of a surface of a first paper substrate to form a first coated paper substrate; (b) applying a second coating comprising a low density polyethylene homopolymer or copolymer onto at least a portion of a surface of a second paper substrate at a temperature above the melting point temperature of the low density polyethylene homopolymer or copolymer to form a second coated paper substrate, wherein the low density polyethylene homopolymer or copolymer optionally comprises a polar functionality; (c) forming a side wall from one of the first paper substrate and the second paper substrate and bonding the side wall to itself along a side edge; (d) forming a bottom from the other of the first paper substrate and the second paper substrate; and (e) bonding the side wall along a bottom edge to the bottom along a side edge to form the paper cup. In some embodiments, the side wall can be bonded to itself along a side edge using the first aqueous-based polymer coating. The bottom portion coated with, for instance, the low density polyethylene homopolymer or copolymer coating can be brought into contact with the side portion (i.e., side wall) coated with, for instance, an aqueous-based polymer coating, and the side portion of the paper cup can be joined using an induction seal, an impulse seal, a pressure seal, or a combination thereof. In other embodiments, the bottom portion coated with, for instance, an aqueous-based polymer coating can be brought into contact with the side portion (i.e., side wall) coated with, for instance, an aqueous-based polymer coating, and the side portion of the paper cup can be joined using an induction seal, an impulse seal, a pressure seal, or a combination thereof. In some embodiments, the side portion of the paper can be bonded to itself or to the bottom portion of the paper cup using heat. For example, the coating on the bottom portion and on the side portion can be heated to above the Vicat softening point of the second coating to produce the seal and form the cup. In some embodiments, the side portion of the paper can be bonded to itself or to the bottom portion of the paper cup without using heat. The cup can be leak-resistant and/or stain-resistant.

The first coating can be used to adhere paper substrates, wherein the first substrate comprises a first coating comprising an aqueous-based polymer coating dispersion (e.g., a copolymer prepared by polymerizing a vinyl aromatic monomer and an acrylic monomer) and the second paper substrate comprises a second aqueous-based polymer coating dispersion by bonding the first coating and the second aqueous-based polymer coating to adhere the first substrate to the second substrate. In some embodiments, the first substrate comprises a first coating comprising an aqueous-based polymer coating dispersion and the second paper substrate comprises a low density polyethylene homopolymer or copolymer, wherein the paper substrates is adhered by bonding the first coating and the second coating to adhere the first substrate to the second substrate. The aqueous based first coating can adhere to itself or a surface coated with a second coating. For example, the first coating can adhere to the second low density polyethylene homopolymer or copolymer coating or a surface coated with the second coating. The first coating can adhere to a non-coated surface.

The aqueous-based polymer coatings described herein can be used on any cellulose-based substrates and in any applications where semi crystalline polymer coatings are used. For instance, the aqueous-based polymer coatings and coated substrates can be used in paper cups, including for instance, disposable paper cups. As an alternative to cups, the coatings described herein can be used for coating paper for the production of paper bags for dry foods, such as, for example, coffee, tea, soup powders, sauce powders; for liquids, such as, for example, cosmetics, cleaning agents, beverages; of tube laminates; of paper carrier bags; of paper laminates and co-extrudates for ice cream, confectionery (e.g., chocolate bars and muesli bars), of paper adhesive tape; of cardboard cups (e.g., paper cups), yogurt pots, soufflé cups; of meal trays, or meat trays; of wound cardboard containers (e.g., cans, drums), of wet-strength cartons for outer packaging (e.g., wine bottles, food); of fruit boxes of coated cardboard; of fast food plates; of clamp shells; of beverage cartons and cartons for liquids, such as detergents and cleaning agents, frozen food cartons, ice packaging (e.g., ice cups, wrapping material for conical ice cream wafers); of paper labels; or of flower pots and plant pots.

The aqueous-based polymer coating and/or semicrystalline polymer coating can impart leak resistance and/or stain-resistance to the paper compared to applications that do not include the first coating. The aqueous-based polymer coating and/or semicrystalline polymer coating can impart leak resistance and/or stain-resistance to the paper compared to applications that do not include the aqueous-based polymer coating and/or semicrystalline polymer coating. In some embodiments, the aqueous-based polymer coating and/or semicrystalline polymer coating can provide improvements in rheology of the paper coating formulation.

The paper cups disclosed herein can be used to hold, for instance, hot liquids like coffee or tea and remain leak-resistant and/or stain-resistant. Coatings that provide a barrier to water, moisture, grease, oil, oxygen etc. must also have the ability to be form a seal and not block during the manufacturing process. For example, paper of paperboard used in a cup that will contain cold or hot liquids must be able to be sealed when the front and back sides of the paper or paperboard are joined and subjected to elevated temperature and pressure and the seal itself must also be resistant to liquid or moisture vapor and maintain its integrity in their presence. For instance, paper cups disclosed herein may exhibit reduced or eliminated leaks from the bottom interface of the paper cups for up to 30 minutes of exposure to hot coffee. For instance, paper cups disclosed herein may exhibit reduced or eliminated staining at the bottom interfaces around the bottom of the paper cups for up to 30 minutes of exposure to hot coffee. Further, the paper cups herein may exhibit minimal tendencies of blocking (i.e., the adhesion of the coated surface to another coated surface, or the adhesion of the coated surface to an uncoated surface) of the extrusion coated paper when wound onto paper rolls, before cutting/forming into bottom portions or side portions of the paper cups. A low degree of adhesion damage to the coated and/or non-coated sides of the roll is desirable. In some embodiments, the paper rolls, when unwound, exhibit layer separation without surface damage to the coated or non-coated side in the roll. Additionally, the coatings, coated substrates, and/or paper cups disclosed herein can exhibit low seal initiation temperature, minimized capillary leakers, improved secondary sealing with thermal sealing at a high temperature and short residence time, flex crack resistance, and high temperature resistance (to the boiling point of water). Additionally, full FDA clearance for all components, as well as no impartation of organoleptics, is desirable.

Water-resistance of the coatings can be tested with the Cobb method, described by TAPPI T 441 (2001), which is incorporated by reference herein in its entirety. This method determines the amount of water absorbed by paper, paperboard, and corrugated fiberboard in a specified time under standardized conditions and, in some embodiments, the coated substrates described herein would pass the water-resistance test set forth in this test method. Water absorptiveness can be a function of various characteristics of paper or paperboard including, but not limited to, sizing and porosity.

Heat sealing performance can be evaluated using a Sencorp model 12ASL/1 sealer. The temperature of both the top and bottom jaws can be set, for instance, at 315° C. Coated sheets can be placed face-to-face and sealed at various times and pressures. Pressures can be varied from, for instance, 20 psi to 30 psi to 40 psi. After sealing and cooling to room temperature, the two pieces of board can be pulled apart, and rated on the level of adhesion. Samples can be given a rating of 1 to 5, based on the following scale:
 1—No adhesion
 2—Adhesion, but no picking or fiber tears
 3—Adhesion with coating transfer or slight fiber tear (<5% of surface area)
 4—Some fiber tear (5-50%)
 5—Fiber tear (>50%)
Since maximum adhesion at the lowest possible times and pressures is desirable, the rating is 5 to ensure adequate heat seal.

Heat sealing can also be quantified using a Qualitest HST-H3 Heat Seal Tester. The temperature of both the top and bottom jaws can be set, for example at 250° C. or less, 200° C. or less, or 150° C. or less to simulate cup forming operations. The dwell times can be adjusted at a given pressure, for example at 40 psi, and force, for example at 380 n/m or greater to achieve "acceptable" fiber tear between substrates.

The semicrystalline polymer coating can have a low seal initiation temperature. The seal initiation temperature can be measured by applying a coating onto 50 lb Kraft paper, measuring a temperature at which 1 lb/in (4.4 N/25.4 mm) heat seal strength is achieved, noting conditions on a Topwave sealer. Additionally, sealing properties can be measured by ASTM F2029 (2008) and Hot Tack Sealing can be measured by ASTM F1921 (2012). Flex Crack Resistance can be measured by ASTM F392 (2011) for plastic films. Further, measuring the pin holes in the coating is important to ensure adequate coating coverage of the paper. Additional test methods and procedures can also be used to determine the improved properties of the coatings and cups disclosed herein.

The paper cups can also be tested using the coffee hold out test, wherein the paper cup (e.g., a standard paper cup of 12 oz.) can be substantially filled with coffee at an initial temperature of approximately 90° C. and maintained for at least 30 minutes. The paper cup can then be evaluated visually to look for leakage from the side seams or bottom seam. A paper cup fails this coffee hold out test if any leaking or staining is visible after the 30 minutes has elapsed and is considered leak-resistant (and stain-resistant) if it passes this coffee hold out test.

EXAMPLES

Example 1: Heat Seal Test of Corona Treated Paperboards Coated with Aqueous-Based Polymer and Semicrystalline Polymer Coatings Aqueous-Based Polymer Coatings:

The aqueous-based polymer coating, Resin G contains a kaolin clay based pigment (25 parts), a styrene acrylic copolymer latex stabilized by oligomers (56.25 parts), and a styrene acrylic copolymer latex stabilized by surfactants (18.75 parts). The aqueous-based polymer coating, C2S3 contains the kaolin clay based pigment (23.5 parts), the styrene acrylic copolymer latex stabilized by oligomers (46.3 parts), and the styrene acrylic copolymer latex stabilized by surfactants (30.2 parts). The aqueous-based polymer coating, Coat 30 contains the kaolin clay based pigment (11.75 parts), a mica pigment (11.75 parts), the styrene acrylic copolymer latex stabilized by oligomers (46.3 parts), and the styrene acrylic copolymer latex stabilized by surfactants (30.2 parts). The aqueous-based polymer coating, Resin 35 contains the kaolin clay based pigment (23.5 parts), the styrene acrylic copolymer latex stabilized by oligomers (46.3 parts), the styrene acrylic copolymer latex stabilized by surfactants (30.2 parts), and a stabilized wax emulsion (10 parts). The aqueous-based polymer coating, Resin 57 contains the kaolin clay based pigment (35 parts), the styrene acrylic copolymer latex stabilized by oligomers (39.3 parts), and the styrene acrylic copolymer latex stabilized by surfactants (25.7 parts)

Semicrystalline Polymer Coatings:

Polyethylene (PE) is a commercially available low density polyethylene (LDPE) homopolymer or copolymer. The low density polyethylene homopolymer for extrusion coating can have a melt index of from 4 to 12 g/10 min and a density of from 0.915-0.925 g/cm$^3$. The low density polyethylene copolymer for extrusion coating can include copolymers of ethylene with methyl acrylate (at 6-13% methyl acrylate) or copolymers of ethylene with methacrylic acid (at 4-10% methacrylic acid). The polyethylene copolymer can have a melt index of from 4 to 12 g/10 min and a density of from 0.920-0.940 g/cm$^3$.

Method:

Provided below is a high speed track method to simulate adhesion between two coated paperboard substrates in commercial cup forming operations. Two 3" square paperboard specimens are cut per sample being tested. One paperboard specimen is coated with an aqueous-based polymer coating, such as described in Table 1, column 3. The aqueous-based coated specimen is then corona treated, for example, as described in Table 1, column 4. The second paperboard specimen is extrusion coated with a 1 mil (25 microns) thick low density PE (LUPE) homopolymer or a functionalized LDPE copolymer, such as described in Table 1, column 5. The coated samples are then mounted on a horizontal "track" with the coated sides physically touching each other (with some minimal force holding them together). The samples are then conveyed past a hot air blower at high speeds, exposing them to the high temperature. The temperature can be from about 500° F. to about 1050° F. and the speed from about 100 cm/minute to about 2390 cm/min. Higher temperatures are needed for faster speed to allow heat transfer to the paper substrates to provide 100% fiber tear when attempting to separate the specimens. A manual, hand separation fiber tear analysis is then performed on cooled (to ambient temperature) specimens, pulling the two square specimens away from each other at a 90° angle. A relative adhesion value is assigned to the pulled specimens (Table 1, last column), based on a scale of 0-9, where 0 is no adhesion, 4 is the threshold showing "minimum acceptable" fiber tear, (that is, good adhesion), and 9 is the best (100% fiber tear).

In the tables provided below, the polyethylene homopolymer and copolymers used in the comparative examples are similar to those used in the inventive examples.

TABLE 1

High speed track adhesion ratings of paperboard coated with Resin G aqueous-based polymer.

| Example No. | Paperboard | Aqueous-based polymer coating Type | Corona-treated aqueous-coating | Semicrystalline-polymer coating type | High speed track adhesion rating (0-9) |
|---|---|---|---|---|---|
| CE 1 | 510 | Resin G | No | LDPE | 0 |
| CE2 | 510 | Resin G | No | EMAA | 0 |
| CE3 | 510 | Resin G | No | EMA | 0 |
| E1 | 510 | Resin G | Yes | EMAA | 4 |
| E2 | 510 | Resin G | Yes | EMA | 7 |

EMA refers to a low density polyethylene copolymer comprising ethylene and methyl acrylate. EMMA refers to a low density polyethylene copolymer comprising ethylene and methacrylic acid.

TABLE 2

High speed track adhesion ratings of paperboard coated with C2S3 aqueous-based polymer.

| Example No. | Paperboard | Aqueous-based polymer coating Type | Corona-treated aqueous-coating | Semicrystalline-polymer coating type | High speed track adhesion rating (0-9) |
|---|---|---|---|---|---|
| CE4 | 498 | C2S3 | No | LDPE | 0 |
| CE5 | 498 | C2S3 | No | EMAA | 0 |
| CE6 | 498 | C2S3 | No | EMA | 0 |
| E3 | 498 | C2S3 | Yes | LDPE | 3 |
| E4 | 498 | C2S3 | Yes | EMAA | 3 |
| E5 | 498 | C2S3 | Yes | EMA | 4 |

TABLE 3

High speed track adhesion ratings of paperboard coated with Coat30 aqueous-based polymer.

| Example No. | Paperboard | Aqueous-based polymer coating Type | Corona-treated aqueous-coating | Semicrystalline-polymer coating type | High speed track adhesion rating (0-9) |
|---|---|---|---|---|---|
| CE7 | 502 | Coat 30 | No | LDPE | 0 |
| CE8 | 502 | Coat 30 | No | EMAA | 0 |
| CE9 | 502 | Coat 30 | No | EMA | 0 |
| E6 | 502 | Coat 30 | Yes | LDPE | 3 |
| E7 | 502 | Coat 30 | Yes | EMAA | 3 |
| E8 | 502 | Coat 30 | Yes | EMA | 4 |

TABLE 4

High speed track adhesion ratings of paperboard coated with Resin 35 aqueous-based polymer.

| Example No. | Paperboard | Aqueous-based polymer coating Type | Corona-treated aqueous-coating | Semicrystalline-polymer coating type | High speed track adhesion rating (0-9) |
|---|---|---|---|---|---|
| CE8 | 504 | RESIN 35 | No | LDPE | 0 |
| CE9 | 504 | RESIN 35 | No | EMAA | 0 |
| CE10 | 504 | RESIN 35 | No | EMA | 0 |
| E9 | 504 | RESIN 35 | Yes | LDPE | 3 |
| E10 | 504 | RESIN 35 | Yes | EMAA | 4 |
| E11 | 504 | RESIN 35 | Yes | EMA | 4 |

TABLE 5

High speed track adhesion ratings of paperboard coated with Resin 57 aqueous-based polymer.

| Example No. | Paperboard | Aqueous-based polymer coating Type | Corona-treated aqueous-coating | Semicrystalline-polymer coating type | High speed track adhesion rating (0-9) |
|---|---|---|---|---|---|
| CE11 | 512 | RESIN 57 | No | LDPE | 0 |
| CE12 | 512 | RESIN 57 | No | EMAA | 0 |
| CE13 | 512 | RESIN 57 | No | EMA | 0 |
| E12 | 512 | RESIN 57 | Yes | LDPE | 3 |
| E13 | 512 | RESIN 57 | Yes | EMAA | 4 |
| E14 | 512 | RESIN 57 | Yes | EMA | 4 |

Example 2: Qualitest Heat Seal Test of Paperboards Coated with Aqueous-Based Polymer Coatings The heat seal of corona treated aqueous-based coatings on paperboard samples were investigated. For each sample being tested, two 1" square paperboard specimens were cut. Both paperboard specimens were coated with an aqueous-based polymer, the ingredients and amount of each aqueous coating is summarized in Table 6.

Figure 2:
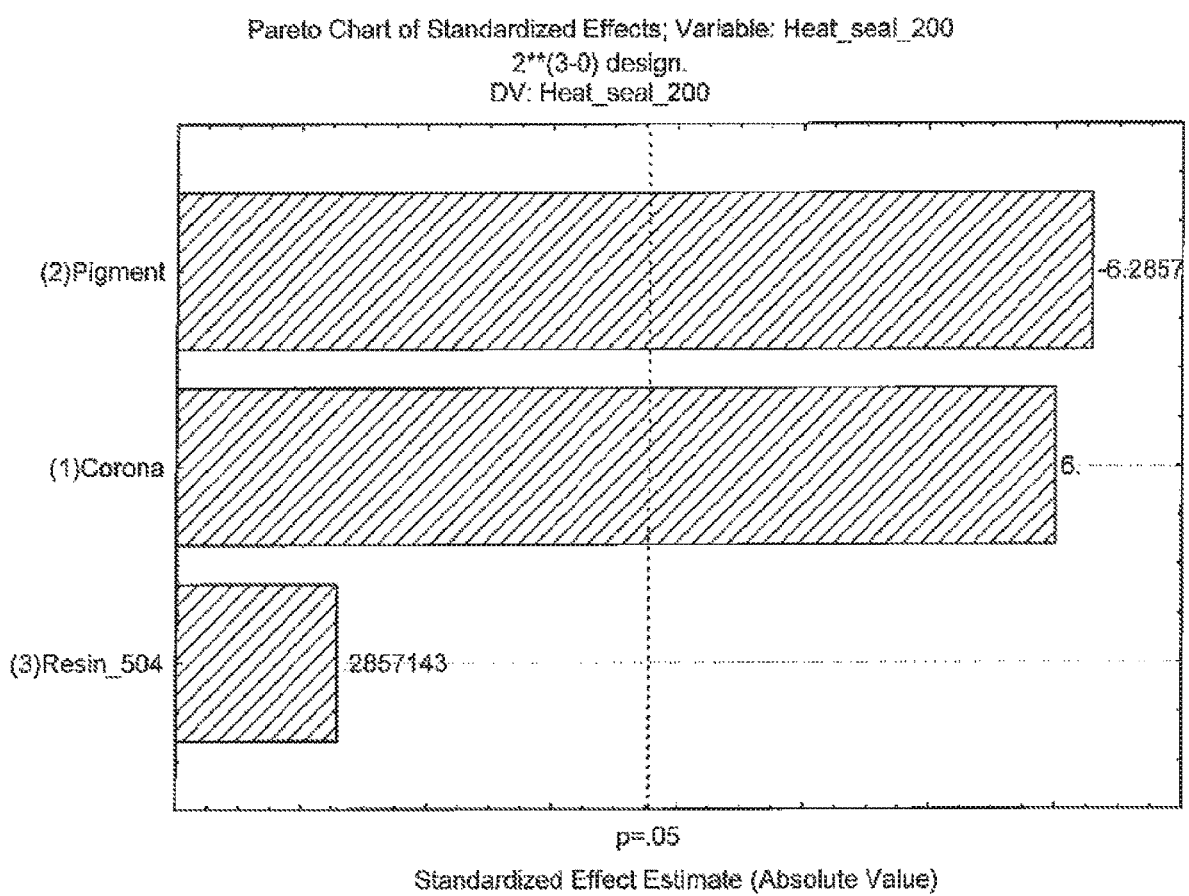
FIG. 2 is a Pareto chart showing the effects of corona treatment, pigment (clay), and resin on heat sealing at 200° C., at a standardized effect estimate of p=0.5 (95% confidence level).
Figure 3:
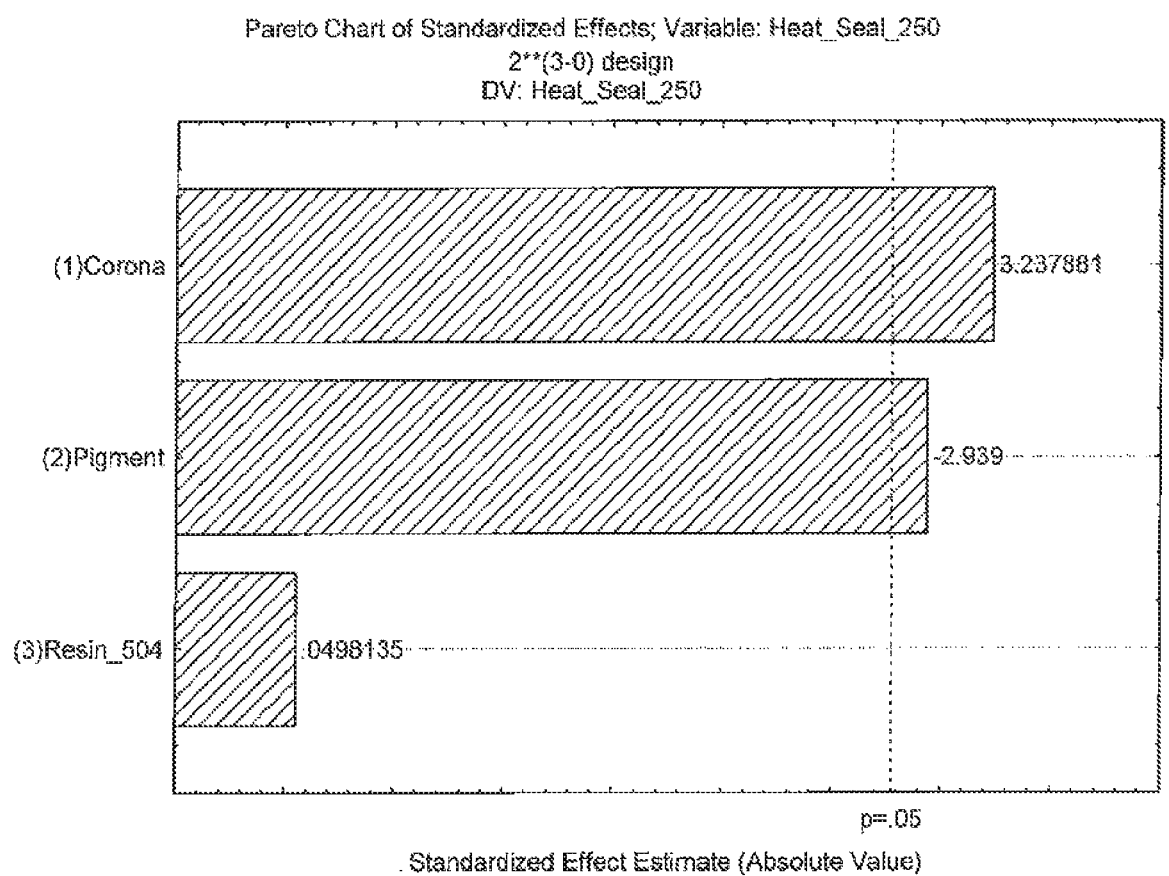
FIG. 3 is a Pareto chart showing the effects of corona treatment, pigment (clay), and resin on heat sealing at 250° C., at a standardized effect estimate of p=0.5 (95% confidence level).
Figure 4:
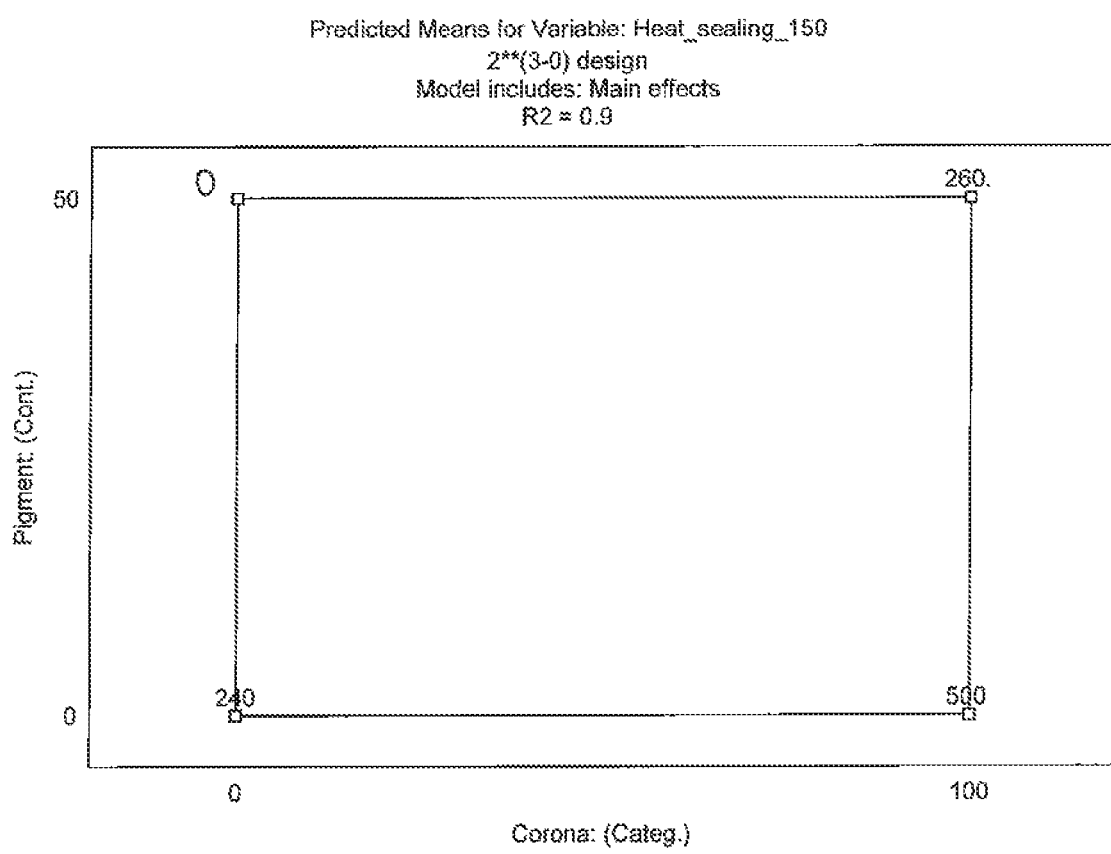
FIG. 4 is a chart showing the predicted means of the effects of corona treatment and pigment (clay) on heat sealing at 150° C., at a standardized effect estimate of p=0.5 (95% confidence level).
Figure 5:
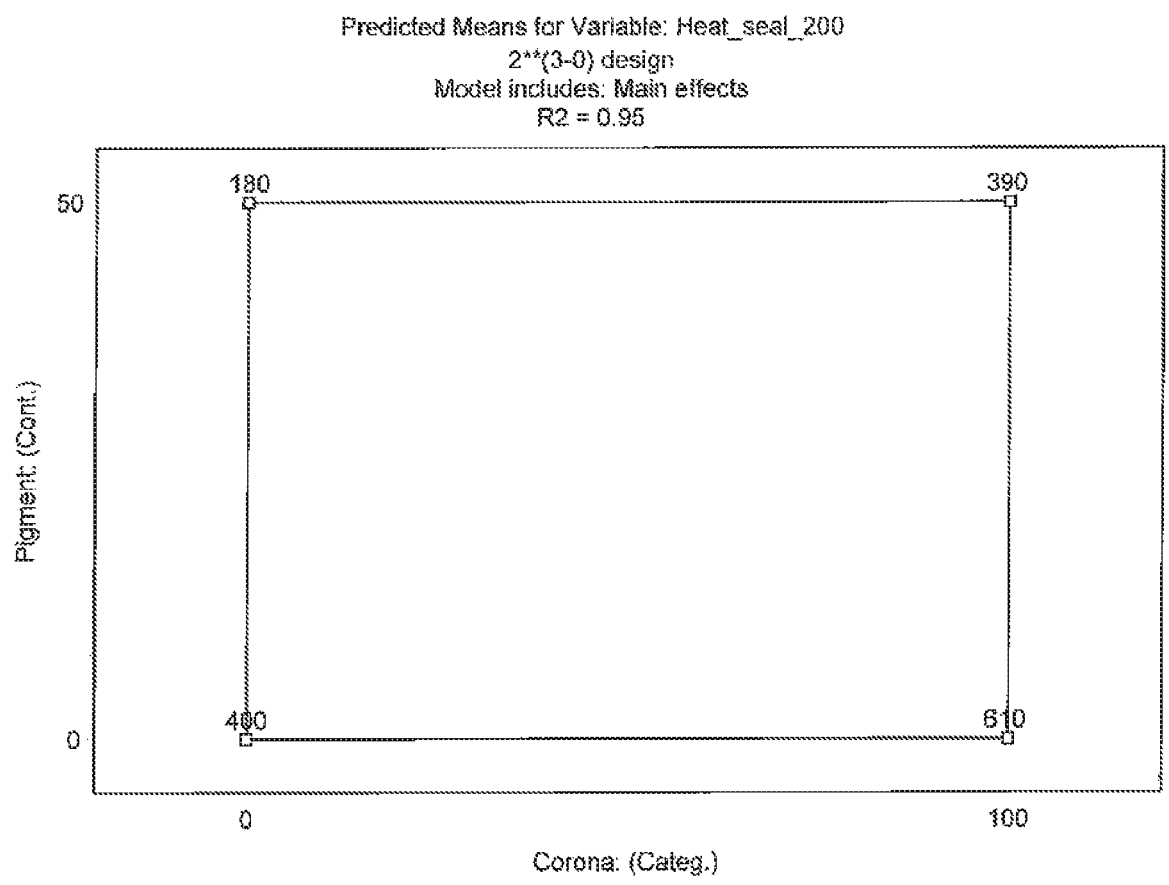
FIG. 5 is a chart showing the predicted means of the effects of corona treatment and pigment (clay) on heat sealing at 200° C., at a standardized effect estimate of p=0.5 (95% confidence level).
Figure 6:
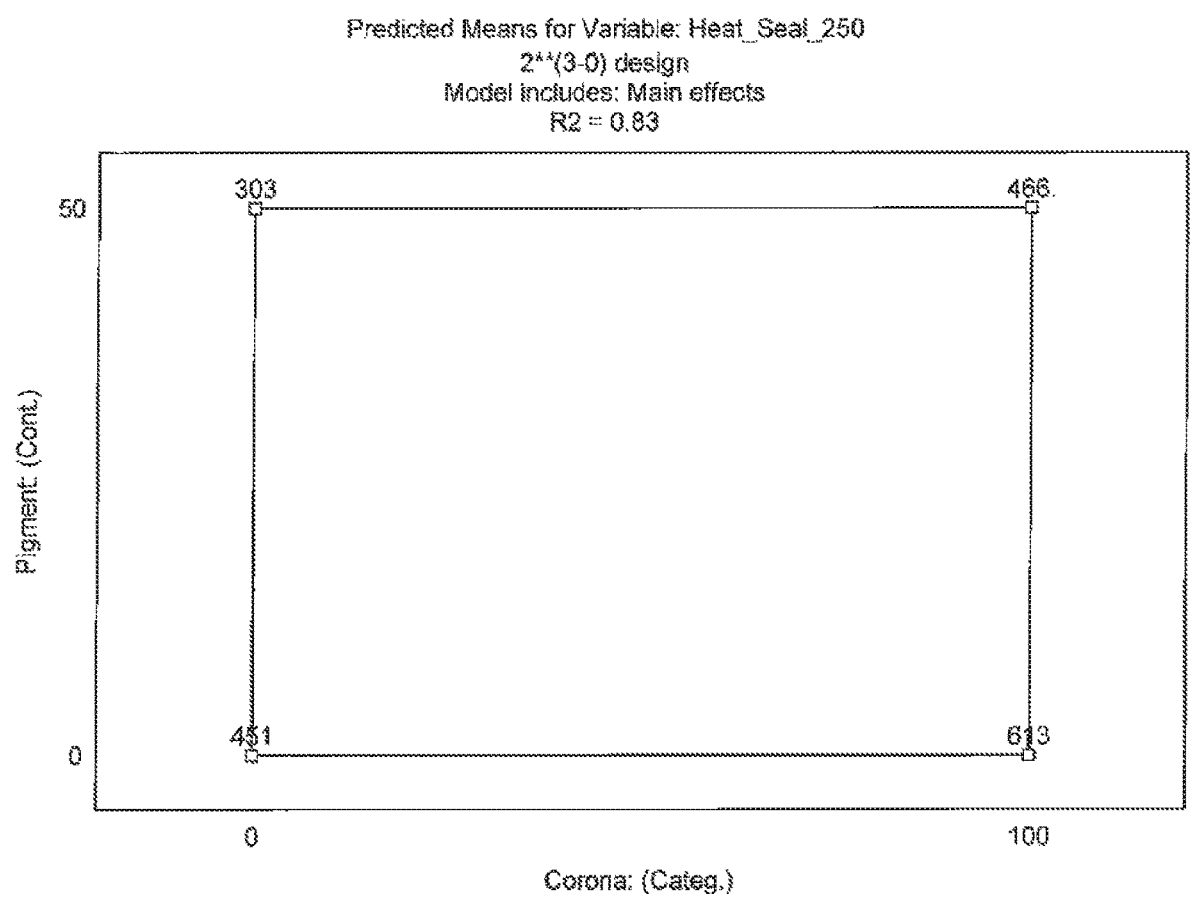
FIG. 6 is a chart showing the predicted means of the effects of corona treatment and pigment (clay) on heat sealing at 250° C., at a standardized effect estimate of p=0.5 (95% confidence level).

The peel strength and fiber tear (substrate damage) of the heat sealed coated paperboards are summarized in Tables 7-9. FIGS. 1-3 show Pareto charts of corona treatment and pigment on sealing at various 150° C., 200° C., and 250° C., respectively at a standardized effect estimate of p=0.5. FIGS. 4-6 shows the predicted means for the heat seal variables.

TABLE 6

Composition of aqueous-based polymer coatings.

| Ingredient | CO2014-0133-1 | CO2014-0133-2 | CO2014-0133-3 | CO2014-0133-4 |
|---|---|---|---|---|
| Kaolin clay pigment | 0 | 50 | 0 | 50 |
| Styrene acrylic copolymer latex stabilized by surfactants | 10 | 5 | 50 | 25 |
| Styrene acrylic resin emulsion | 90 | 45 | 50 | 25 |
| Polyacrylate copolymer latex | 0.1 | 0.1 | 0.1 | 0.1 |
| Thickening aid | 0.4 | 0.4 | 0.4 | 0.4 |
| Calcium stearate dispersion | 1.2 | 1.2 | 1.2 | 1.2 |
| Defomer | 0.1 | 0.1 | 0.1 | 0.1 |

The total solids in each sample is as formulated. The pH is 8.5

TABLE 7

Qualitest peel strength of paperboard samples coated with an aqueous-based polymer that are heat sealed at 250° C.

| | Control (not corona treated) | | Corona treated | |
|---|---|---|---|---|
| Sample | Peel Strength/ N/m | Substrate Damage | Peel Strength/ N/m | Substrate Damage |
| CO2014-0133-1 | 510 | Yes | 640 | Yes |
| CO2014-0133-2 | 290 | No | 390 | Yes |
| CO2014-0133-3 | 380 | No | 600 | Yes |
| CO2014-0133-4 | 330 | No | 530 | Yes |

Sealing temperature: 250° C.; dwell time: 1 sec (100° C. on paper surface)
Peel test of 1 inch wide specimen with 2 in/min.

TABLE 8

Qualitest peel strength of paperboard samples coated with an aqueous-based polymer that are heat sealed at 200° C.

| | Control (not corona treated) | | Corona treated | |
|---|---|---|---|---|
| Sample | Peel Strength/ N/m | Substrate Damage | Peel Strength/ N/m | Substrate Damage |
| CO2014-0133-1 | 380 | Yes | 670 | Yes |
| CO2014-0133-2 | 170 | No | 340 | Partly |
| CO2014-0133-3 | 380 | Partly | 590 | Yes |
| CO2014-0133-4 | 230 | No | 400 | Yes |

Sealing temperature: 200° C.; dwell time: 1 sec (80° C. on paper surface)
Peel test of 1 inch wide specimen with 2 in/min.

TABLE 9

Qualitest peel strength of paperboard samples coated with an aqueous-based polymer that are heat sealed at 150° C.

| | Control (not corona treated) | | Corona treated | |
|---|---|---|---|---|
| Sample | Peel Strength/ N/m | Substrate Damage | Peel Strength/ N/m | Substrate Damage |
| CO2014-0133-1 | 140 | No | 550 | Yes |
| CO2014-0133-2 | 0 | No | 120 | No |
| CO2014-0133-3 | 230 | No | 560 | Yes |
| CO2014-0133-4 | 110 | No | 290 | No |

Sealing temperature: 150° C.; dwell time: 1 sec (65° C. on paper surface)
Peel test of 1 inch wide specimen with 2 in/min.

Figure 7:
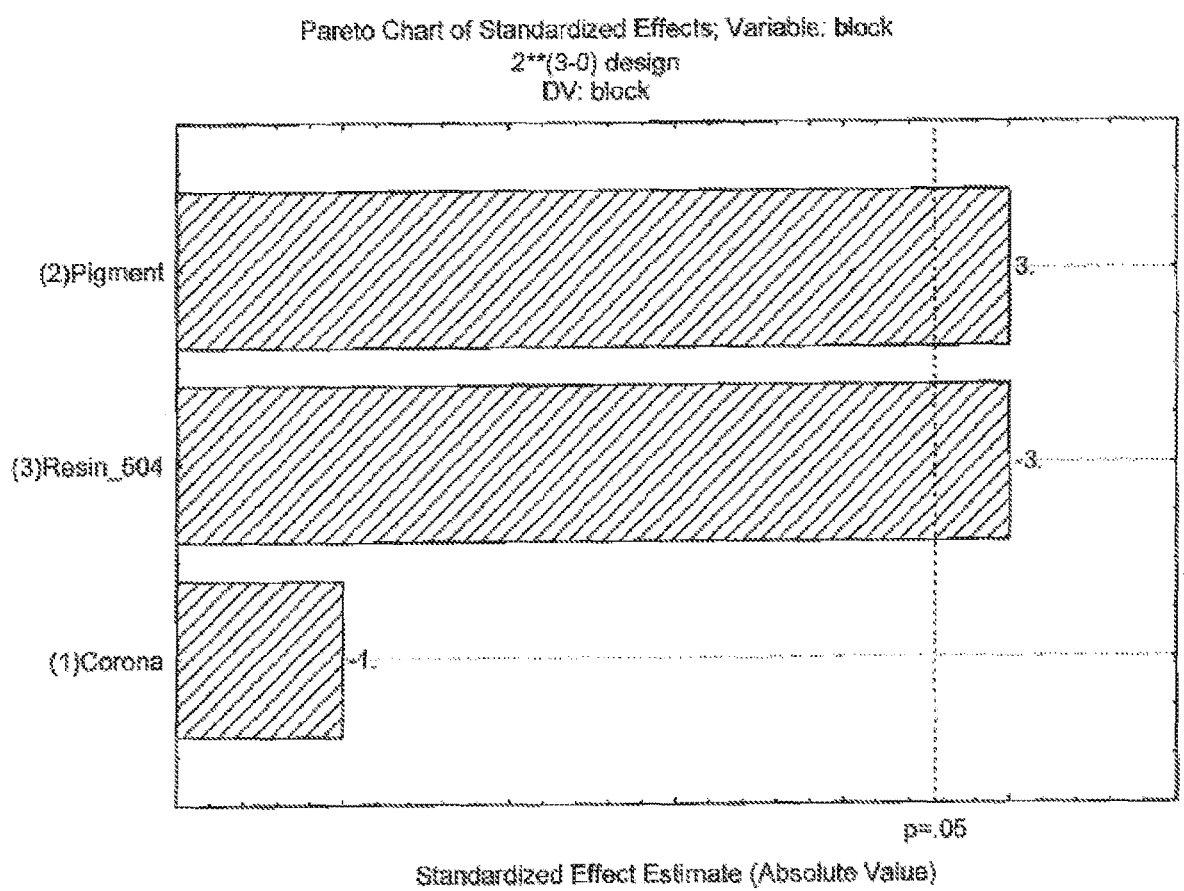
FIG. 7 is a Pareto chart showing the effects of corona treatment, pigment (clay), and resin on blocking resistance, at a standardized effect estimate of p=0.5 (95% confidence level).
Figure 8:
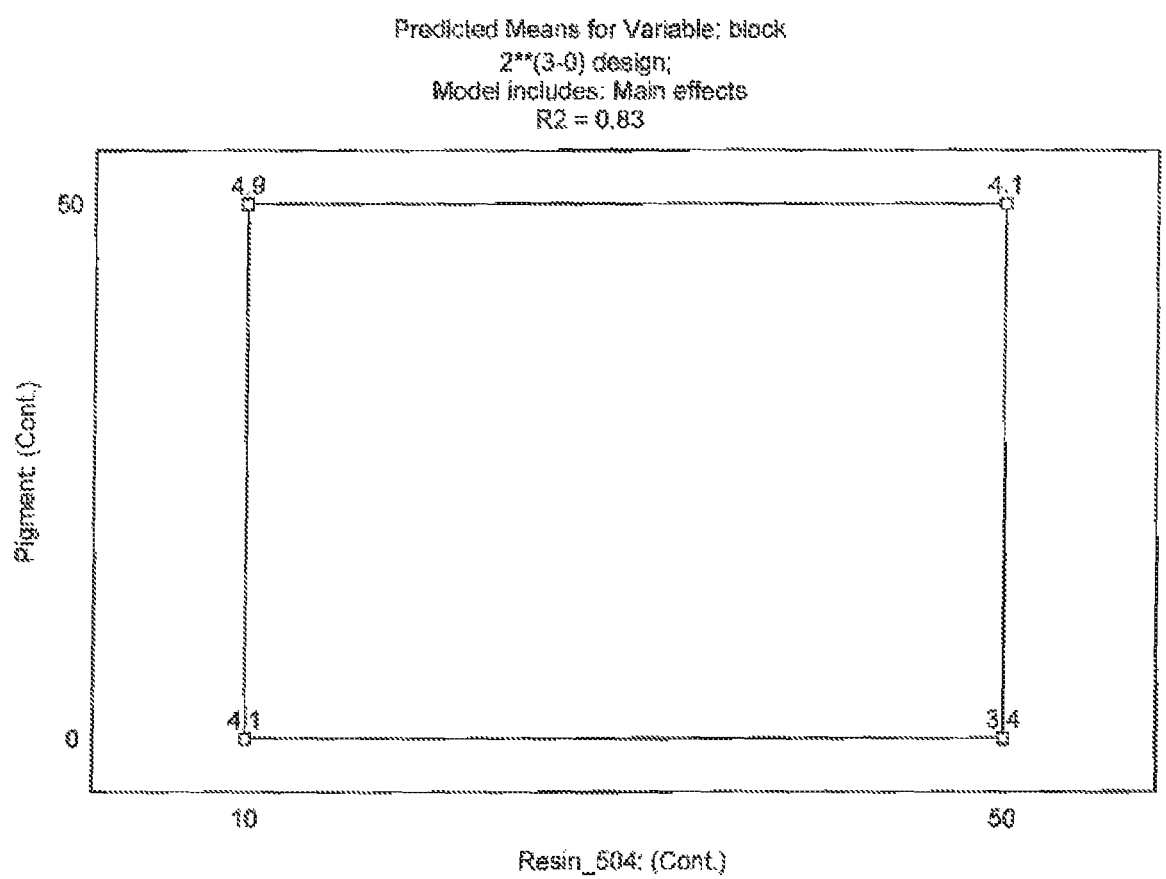
FIG. 8 is a chart showing the predicted means of the effects of pigment and resin on blocking resistance, at a standardized effect estimate of p=0.5 (95% confidence level).

Blocking Resistance:

Blocking resistance was evaluated on the samples at 60 psi, 50° C. for 24 hours. The samples were given a rating of 1 to 5 (Table 10), based on the following scale: 5=no tack (no blocking); 4=low tack; 3=heavy tack; 2=substrate damage on separation, less than 25% damage; 1=substrate damage on separation, more than 25% damage (heaviest blocking), FIGS. 7 and 8 show a Pareto chart and the predicted means, respectively of corona treatment and pigment on heat sealing, at a standardized effect estimate of $p=0.5$.

TABLE 10

Blocking resistance of paperboard coated with aqueous-based polymer.

| Sample | Control | Corona treated |
|---|---|---|
| CO2014-0133-1 | 4 | 4 |
| CO2014-0133-2 | 5 | 5 |
| CO2014-0133-3 | 4 | 3 |
| CO2014-0133-4 | 4 | 4 |

Figure 9:
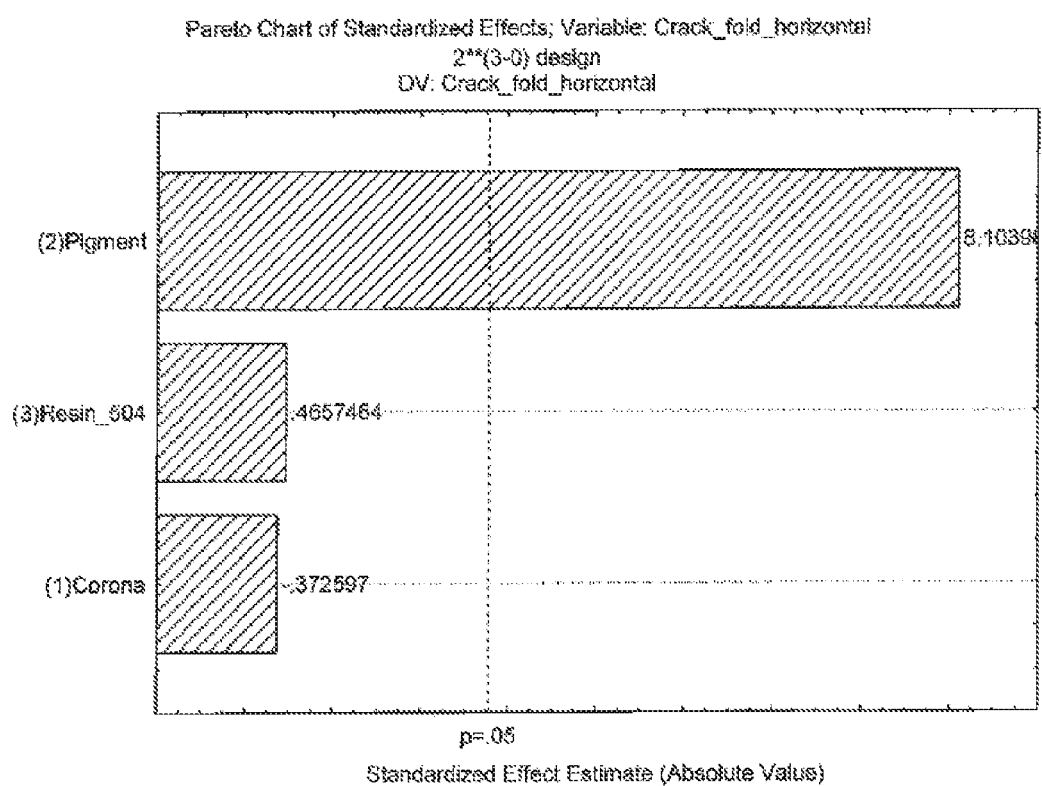
FIG. 9 is a Pareto chart showing the effects of corona treatment, pigment (clay), and resin on leaking, at a standardized effect estimate of p=0.5 (95% confidence level).
Figure 10:
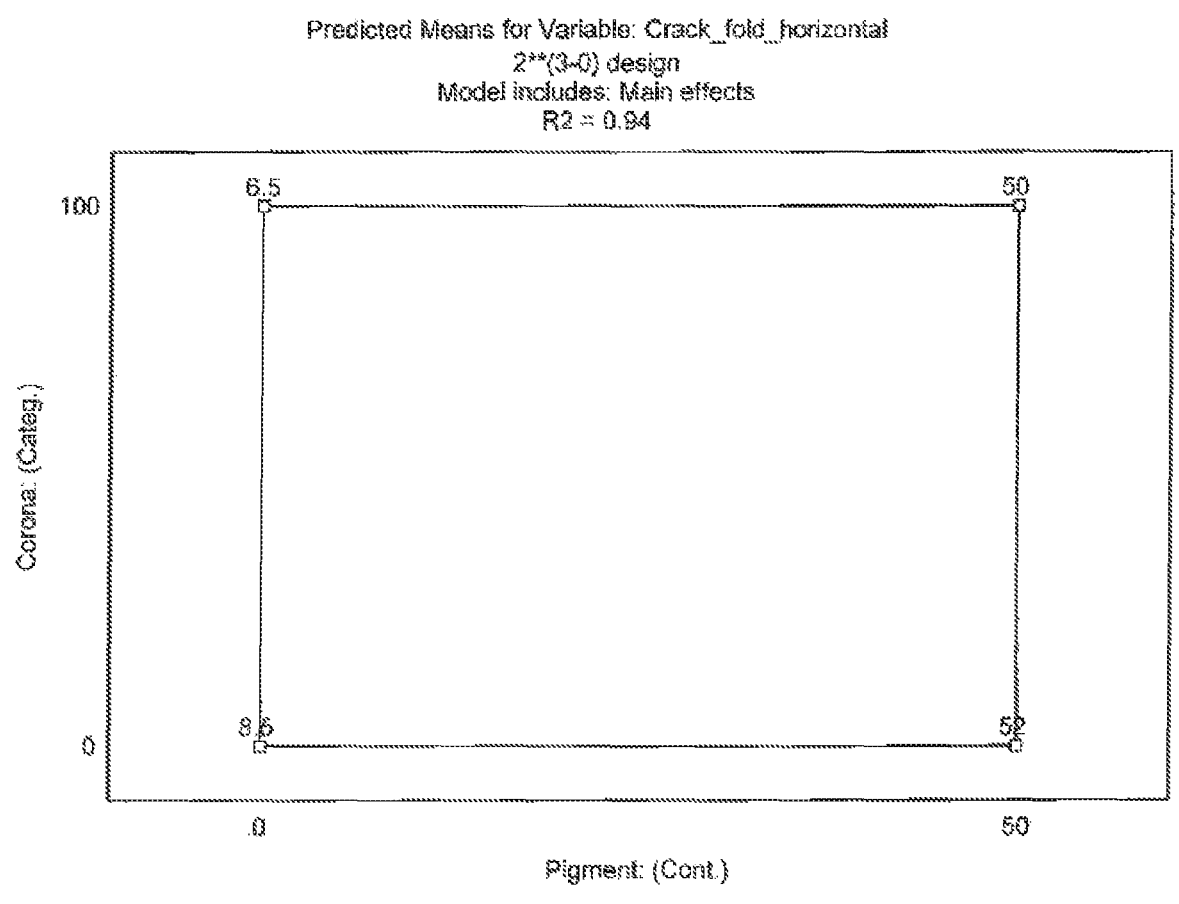
FIG. 10 is a chart showing the predicted means of the effects of pigment and resin on leaking, at a standardized effect estimate of p=0.5 (95% confidence level).

Leak Test:

Coated paperboard samples were folded along a vertical line and a horizontal line. A solution of red pigment dispersion in water was applied to the fold. The solution was allowed to sit on the creased portion for 10 minutes, then wiped off. The samples were then rated (Table 11) by counting the number of dots per inch along the crease, and scored based on the following scale: 5=0 dots/in; 4=1-5 dots/in; 3=6-10 dots/in; 2=11-30 dots/in; 1=>30 dots/in. FIGS. 9 and 10 show a Pareto chart and the predicted means, respectively of corona treatment and pigment on sealing, at a standardized effect estimate of $p=0.5$.

TABLE 11

Leak test of paperboard coated with aqueous-based polymer.

| Sample | Folding Orientation | Rating | Avg. # Dots/inch |
|---|---|---|---|
| CO2014-0133-1 Control | Horizontal | 2 | 13 |
| CO2014-0133-1 Control | Vertical | 4 | 3 |
| CO2014-0133-1 Corona treated | Horizontal | 3 | 10 |
| CO2014-0133-1 Corona treated | Vertical | 3 | 7 |
| CO2014-0133-2 Control | Horizontal | 1 | 47 |
| CO2014-0133-2 Control | Vertical | 1 | 39 |
| CO2014-0133-2 Corona treated | Horizontal | 1 | 42 |
| CO2014-0133-2 Corona treated | Vertical | 1 | 35 |
| CO2014-0133-3 Control | Horizontal | 4 | 4 |
| CO2014-0133-3 Control | Vertical | 4 | 2 |
| CO2014-0133-3 Corona treated | Horizontal | 4 | 3 |
| CO2014-0133-3 Corona treated | Vertical | 4 | 2 |
| CO2014-0133-4 Control | Horizontal | 1 | 57 |
| CO2014-0133-4 Control | Vertical | 1 | 49 |
| CO2014-0133-4 Corona treated | Horizontal | 1 | 58 |
| CO2014-0133-4 Corona treated | Vertical | 1 | 47 |

As shown in Tables 9-11, the corona treated samples had a significant increase in peel strength while still providing insignificant effects on blocking and leaking. The change in blocking resistance was unexpected as increases in peel strength typically result in corresponding increases in blocking.

Figure 11:
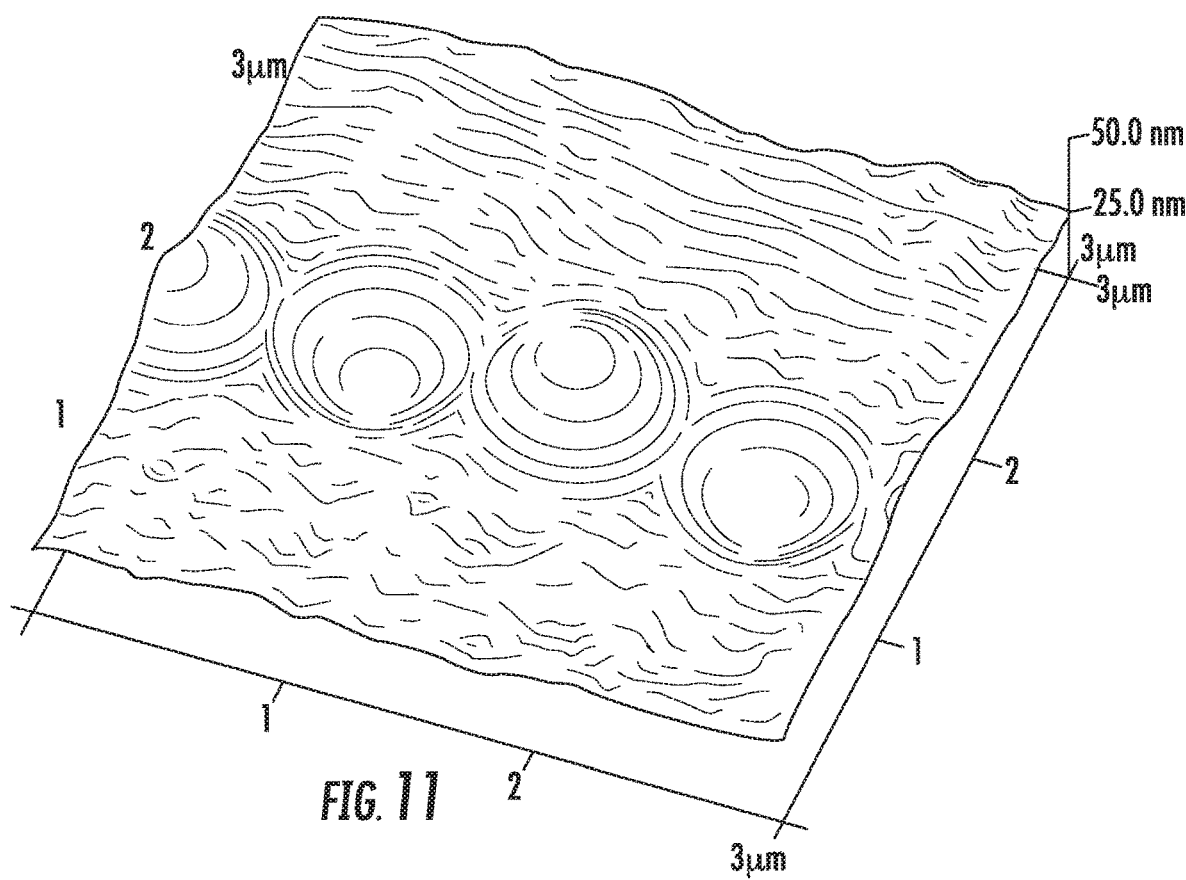
FIG. 11 is an image of a paperboard surface coated with an aqueous-based polymer coating.
Figure 12:
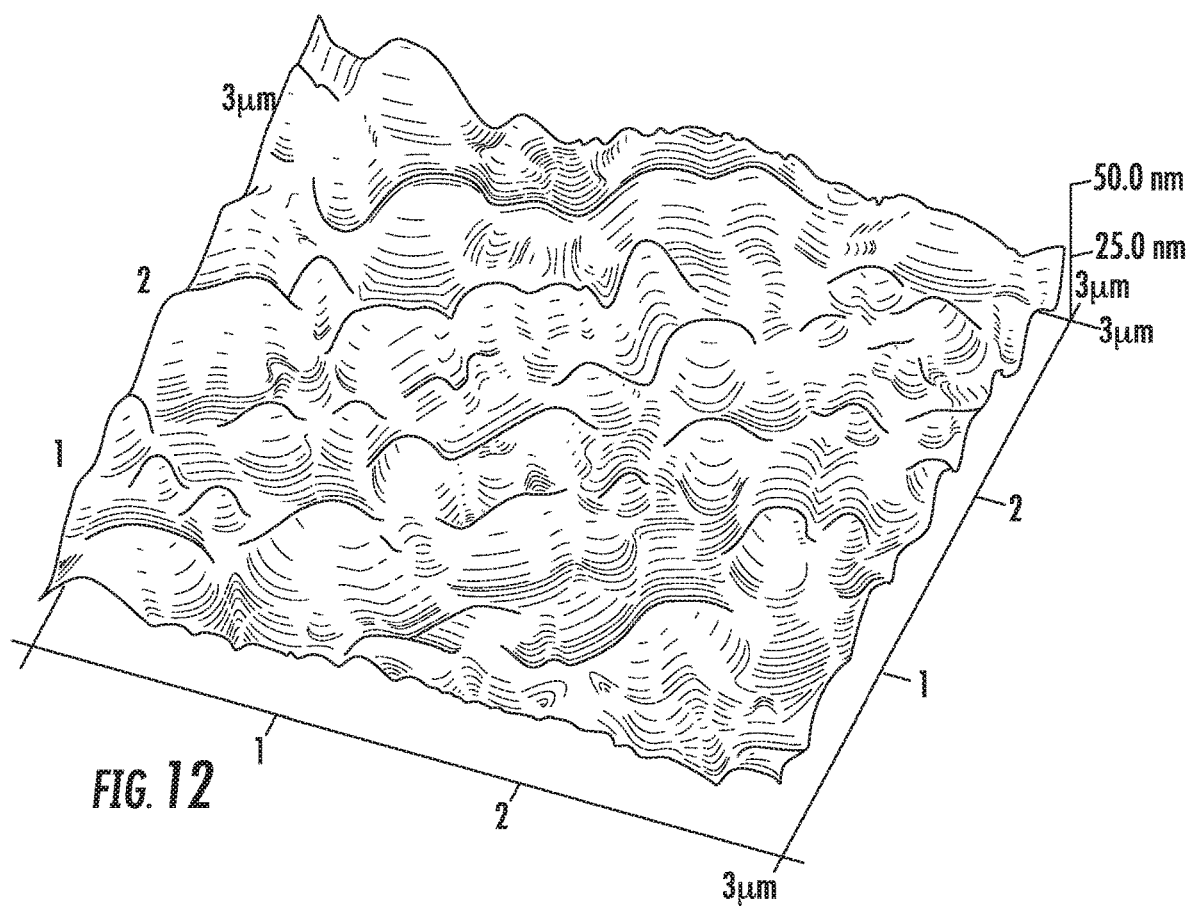
FIG. 12 is an image of a corona treated paperboard surface coated with an aqueous-based polymer coating.

Analytical Investigation:

The surface of treated and untreated paperboard surfaces were analyzed with FT-IR, Atomic FORCE Microscopy (AFM), and scanning Electron Microscopy (SEM) with Energy Dispersive X-Ray Spectroscopy (EDS). The treated paperboard surface was a corona treated aqueous polymer. FIGS. 11 and 12 are AFM images showing the changes in surface roughness of untreated and corona treated paperboard surfaces, respectively. A two-phase system was seen on the surface of the untreated paperboard with a soft, resin phase appearing to pool more at the surface relative to the corona treated surface. Peaks and valleys were seen on the surface of the corona treated paperboard, which contribute to a rough surface that could provide larger surface area to increase bond strength between corona treated coated samples.

Investigation of the Peel Strength and Block Resistance of Coated Paperboard Samples at Various Corona Treatment Levels:

The peel strength and block resistance of paperboard samples (14 point SBS board) coated with CO2014-0133-1, as described above, was determined at various corona treatment levels. All paperboard samples were heat sealed at 150° C. The blocking tests were carried out at 50° C., 60 psi, for 24 hours. The results are shown in Table 12.

TABLE 12

Peel strength and blocking resistance of corona treated coated paperboards.

| | | Peel | | Block Resistance | |
|---|---|---|---|---|---|
| Experiment | Corona treatment level | Strength/ N/m | Substrate Damage | F-F | F-B |
| 1 | None | 81 | No | 3 | 5 |
| 2 | High | 762 | Yes | 3 | 4 |

TABLE 12-continued

Peel strength and blocking resistance of corona treated coated paperboards.

| Experiment | Corona treatment level | Peel Strength/ N/m | Substrate Damage | Block Resistance F-F | Block Resistance F-B |
|---|---|---|---|---|---|
| 3 | 63 ft/min (4 watts/sq.ft./min) | 716 | Yes | 3 | 4 |
| 4 | 83 ft/min (3 watts/sq.ft./min) | 588 | Yes | 3 | 4.5 |
| 5 | 125 ft/min (2 watts/sq.ft./min) | 724 | Yes | 3 | 5 |

F-F refers to front to front of substrate;
F-B refers to front to back of substrate.
The front sides of substrates were corona treated.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A coated substrate, comprising:
a cellulose-based substrate, and
an aqueous-based polymer coating on a surface of the cellulose-based substrate,
wherein the aqueous-based polymer coating has been surface treated with corona treatment and the aqueous-based polymer coating comprises an oligomer-stabilized styrene acrylic copolymer latex, a surfactant-stabilized styrene acrylic copolymer latex, or a combination thereof.

2. The coated substrate according to claim 1, wherein the cellulose-based substrate is paperboard.

3. The coated substrate according to claim 1, wherein the aqueous-based polymer coating has a coating weight of 10 g/m² to 25 g/m².

4. The coated substrate according to claim 1, wherein the aqueous-based polymer coating further comprises a pigment that has been treated with a material selected from the group consisting of surfactants; hydrophobically-modified polymers; styrene-acrylic resin emulsions; styrene-butadiene latex emulsions; silanes, siloxanes, siloxane/silicone resin blends, and their carbon-based analogs; and combinations thereof to form a treated pigment.

5. The coated substrate according to claim 1, wherein the aqueous-based polymer coating comprises the oligomer-stabilized styrene acrylic copolymer latex.

6. The coated substrate according to claim 1, wherein the aqueous-based polymer coating comprises the surfactant-stabilized styrene acrylic copolymer latex.

* * * * *